(12) United States Patent
DeBettencourt et al.

(10) Patent No.: US 6,279,001 B1
(45) Date of Patent: Aug. 21, 2001

(54) WEB SERVICE

(75) Inventors: Jason DeBettencourt, Framingham; Marco Lara, Topsfield; Stanley Yamane, Framingham; Freeland Abbott, Arlington, all of MA (US)

(73) Assignee: Webspective Software, Inc., Needham, MA (US)

( * ) Notice: Subject to any disclaimer, the term of this patent is extended or adjusted under 35 U.S.C. 154(b) by 0 days.

(21) Appl. No.: 09/086,874

(22) Filed: May 29, 1998

(51) Int. Cl.[7] ............................. G06F 17/30; G06F 15/16; G06F 15/177

(52) U.S. Cl. ............................. 707/10; 707/103; 709/217; 709/218; 709/221

(58) Field of Search ....................... 707/10, 103; 709/221, 709/217, 218; 395/200.33

(56) References Cited

U.S. PATENT DOCUMENTS

| | | | |
|---|---|---|---|
| 5,341,477 | 8/1994 | Pitkin et al. | 395/200 |
| 5,459,837 | 10/1995 | Caccavale | 709/226 |
| 5,475,813 | 12/1995 | Cielak et al. | 395/182.02 |
| 5,613,155 | 3/1997 | Baldiga et al. | 710/5 |

(List continued on next page.)

OTHER PUBLICATIONS

Mason, R. "Atreve Announces WebSpective: The First Tool for Web Operations Management," International Data Corporation, 16 pgs., 1998.

Atreve Software, Inc. "Insuring Your Web Business for Online Success," Aug. 3, 1998, 2 pgs.

Atreve Software, Inc. "The Case for Web Operations Management," Aug. 3, 1998, 2 pgs.

Atreve Software, Inc. "WEBSPECTIVE™ Release 2," Aug. 3, 1998, 2 pgs.

(List continued on next page.)

Primary Examiner—Thomas Black
Assistant Examiner—Frantz Coby
(74) Attorney, Agent, or Firm—Testa, Hurwitz & Thibeault LLP

(57) ABSTRACT

A system for serving web pages manages a plurality of web servers. The system provides an operator with features and tools to coordinate the operation of the multiple web servers. The system can manage traffic by directing web page requests to available web servers and balancing the web page request service load among the multiple servers. The system can collect data on web page requests and web server responses to those web page requests, and provide reporting of the data as well as automatic and manual analysis tools. The system can monitor for specific events, and can act automatically upon the occurrence of such events. The events can include predictions or thresholds that indicate impending system crises. The system can include crisis management capability to provide automatic error recovery, and to guide a system operator through the possible actions that can be taken to recover from events such as component failure or network environment problems. The system can present current information about the system operation to a system operator. The system can manage content replication.

20 Claims, 11 Drawing Sheets

U.S. PATENT DOCUMENTS

| | | | |
|---|---|---|---|
| 5,655,081 | 8/1997 | Bonnell et al. | 395/292 |
| 5,715,453 | 2/1998 | Stewart | 395/615 |
| 5,742,768 * | 4/1998 | Gennaro et al. | 395/200.33 |
| 5,761,507 | 6/1998 | Govett | 395/684 |
| 5,774,660 | 6/1998 | Brendel et al. | 395/200 |
| 5,774,668 | 6/1998 | Choquier et al. | 395/200.53 |
| 5,781,449 | 7/1998 | Rosborough | 709/224 |
| 5,848,270 | 12/1998 | Deluca et al. | 395/675 |
| 5,867,706 | 2/1999 | Martin et al. | 395/675 |
| 5,870,559 * | 2/1999 | Leshem et al. | 395/200.54 |
| 5,881,238 | 5/1999 | Aman et al. | 395/200.56 |
| 5,894,554 * | 4/1999 | Lowery et al. | 395/200.33 |
| 5,903,757 | 5/1999 | Gretz et al. | 395/704 |
| 5,917,491 * | 6/1999 | Bauersfeld | 345/352 |
| 5,933,490 | 8/1999 | White et al. | 379/221 |
| 5,933,596 | 8/1999 | Mayhew | 395/200.33 |
| 5,933,606 | 8/1999 | Mayhew | 395/200.69 |
| 5,940,594 | 8/1999 | Ali et al. | 395/200.33 |
| 5,951,643 * | 9/1999 | Shelton et al. | 709/227 |
| 5,954,798 * | 9/1999 | Shelton et al. | 709/224 |
| 5,956,716 * | 9/1999 | Kenner et al. | 707/10 |
| 5,958,008 * | 9/1999 | Pogrebisky et al. | 709/223 |
| 5,958,016 * | 9/1999 | Chang et al. | 709/229 |
| 5,964,836 * | 10/1999 | Rowe et al. | 709/221 |
| 5,974,441 | 10/1999 | Rogers et al. | 709/200 |
| 5,974,462 | 10/1999 | Aman et al. | 709/225 |
| 5,974,572 * | 10/1999 | Weinberg | 714/47 |
| 6,006,260 | 12/1999 | Barrick, Jr. et al. | 709/224 |
| 6,006,264 | 12/1999 | Colby et al. | 709/226 |
| 6,014,437 * | 1/2000 | Acker et al. | 379/219 |
| 6,016,504 * | 1/2000 | Arnold et al. | 709/200 |
| 6,021,439 * | 2/2000 | Turek et al. | 709/224 |
| 6,023,722 | 2/2000 | Colyer | 709/201 |
| 6,026,414 | 2/2000 | Anglin | 707/204 |
| 6,035,323 | 3/2000 | Narayen et al. | 709/201 |
| 6,035,332 | 3/2000 | Ingrassia, Jr. et al. | 709/224 |
| 6,037,935 | 3/2000 | Bates et al. | 345/335 |
| 6,041,041 | 3/2000 | Ramanathan | 370/241 |
| 6,052,718 | 4/2000 | Gifford | 709/219 |
| 6,070,191 | 5/2000 | Narendran et al. | 709/226 |
| 6,094,659 * | 7/2000 | Bhatia | 707/104 |
| 6,098,093 | 8/2000 | Bayeh et al. | 709/203 |
| 6,101,508 | 8/2000 | Wolf | 707/218 |
| 6,122,658 | 9/2000 | Chaddha | 709/203 |
| 6,128,279 | 10/2000 | O'Neil et al. | 370/229 |
| 6,148,335 | 11/2000 | Haggard et al. | 709/224 |

OTHER PUBLICATIONS

Computerworld, "the buzz," pp. 6–9, Jul. 27, 1998, http://www.computerworld.com/home/emmerce.nsf/all/980727buzz.

Atreve Software, Inc. "The WebSpective Content Distributor," Jun. 1998, 9 pgs.

Press Release "Atreve Software Secures $8.6 Million in Second Round of Venture Financing," Jun. 29, 1998, 3 pgs.

Computerworld, "Atreve Software Has Introduced WebSpective Release 2," Jun. 15, 1998, 1 pg.

Babcock, C. "Atreve Eases Web App Management," Inter@ctive Week Online, Jun. 15, 1998, 2 pgs.

Babcock, C. "Atreve Eases Web App Management," Inter@ctive Week, Jun. 15, 1998, 1 pg.

Internet News.Com Online, "Atreve Delivers WebSpective Release 2," Jun. 10, 1998, 1 pg.

Internet World Online, "Atreve Upgrades WebSpective System," Jun. 10, 1998, 1 pg.

New Product News Online, "Atreve Introduces The Only Complete Solution For Web Operations Management," Jun. 8, 1998, 2 pgs.

Infoworld Electric Online, "Intranets & I–Commerce," Jun. 8, 1998, 1 pg.

Infoworld, "Shipping," Jun. 8, 1998, 1 pg.

Internet World Products and Services, "Atreve Upgrades WebSpective System," Jun. 8, 1998, 1 pg.

Joachim, D. "Web Mgm't Tool Keeps Tabs On User Experience," Internet Week Online, Jun. 8, 1998, 1 pg.

Joachim, D. "Web Mgm't Tool Keeps Tabs On User Experience," Internet Week, Jun. 8, 1998, 1 pg.

Hannon, B. "Atreve Puts New WebSpective On Online Site Management," PC Week, Jun. 8, 1998, 1 pg.

Press Release "Atreve Introduces the Only Complete Solution for Web Operations Management–Webspective Release 2," Jun. 8, 1998, 3 pgs.

Press Release "Comprehensive Content Replication and Distribution Module Added to Atreve's Webspective Solution," Jun. 8, 1998, 3 pgs.

Joachim, D. "Atreve's Web Management Tool Keeps Tabs on User Experience," CMP.NET Online, Jun. 5, 1998, 2 pgs.

Hannon, B. "Atreve Puts New WebSpective On Online Site Management," PC Week Online, Jun. 5, 1998, 1 pg.

Husum, D. "Building on Experience: Atreve Positions Web Management Suite to Interrupt Final Stage of Site Demise," Web Vantage Online, Jun. 5, 1998, 2 pgs.

Clark, T. "Atreve updates site management," CNET NEWS.COM, Jun. 3, 1998, 1 pg.

Atreve Software, Inc. "Atreve WebSpective and Cisco Local Director,", May 1998, 10 pgs.

Desmond, P. "Atreve to beef up Web management tool," Network World.Fusion, May 29, 1998, 2 pgs.

Atreve Software, Inc. "Managing a Successful Financial–Services Web Presence," Apr. 29, 1998, 2 pgs.

Press Release "Atreve's WEBSPECTIVE™ 1.5 Increases Performance and Availability of Commerce–Critical Web Sites," Apr. 27, 1998, 3 pgs.

Atreve Software, Inc. "Mission Control for Web Operations: A White Paper," Apr. 15, 1998, 18 pgs.

Press Release "Atreve Software Names Doherty CFO," Apr. 13, 1998, 2 pgs.

Press Release "Atreve Software Incorporates RSA Encryption for SSL–Secure Web Application Solution," Mar. 17, 1998, 2 pgs.

Atreve Software, Inc. "The Case for Web Application Management," Mar. 9, 1998, 2 pgs.

Freeman, E. "New tools help server farms blossom," Datamation, Feb. 1998, 5 pgs.

Delmonico, D. "Web–Site Management Tools: Big Market With Room For Growth," Internet Week, Feb. 23, 1998, 4 pgs.

Barnes, M. "e–Commerce Ready to Explode," Boston Software Newspaper, Jan. 1998, 2 pgs.

Network Magazine, "WebSpective 1.5 Manages Web Server Loads," Network Magazine, Jan. 12, 1998, 1 pg.

Press Release "Atreve Software, Inc. Names Joe Debold Vice President of Sales," Jan. 6, 1998, 2 pgs.

Karpinski, R. "Net Marketing: Web Impact: New Load Balancers Can Help Your Site Serve More Customers," Business Marketing, Jan. 1, 1998, 2 pgs.

Bank Technology News, "Wall Street Highlights Problem Of Web Jams," Faulkner & Gray, Inc., Dec. 1997, 2 pgs.

Bank Technology News, "Wall Street Highlights Problem Of Web Jams," Bank Technology News, Dec. 1997, 2 pgs.

Computerworld, "New Products," Computerworld, Dec. 8, 1997, 1 pg.

LAN Times, "Inspecting Internet applications," LAN Times, Dec. 8, 1997, 1 pg.

Wallace et al. "Load balancers aid Web site access," Computerworld, Dec. 1, 1997, 2 pgs.

Eddy, A. "Atreve software to lighten Web management load," Network World, Nov. 24, 1997, 2 pgs.

Wilson, T. "Atreve Sees New Perspective," Internet Week, Nov. 24, 1997, 1 pg.

Wilson, T. "Scrutinizing Web Performance," Internet Week, Nov. 17, 1997, 2 pgs.

Wilson, T. "Scrutinizing Web Performance Increased Internet—Traffic Problematic When There's No Time to Plan," Internet Week Online, Nov. 17, 1997, 2 pgs.

Wilson, T. "Wall Street Frenzy Leaves Website Managers; Taking Stock," Internet Week Online, Nov. 13, 1997, 2 pgs.

Degnan, C. "Atreve shakes out the cobwebs," Mass. High Tech, Nov. 7–13, 1997, 1 pg.

Petersen, S. "WebSpective Tightens The Reins on Web Apps," PC Week, Nov. 10, 1997, 1 pg.

Petersen, S. "WebSpective Tightens the Reins on Web Apps," PC Week Online, Nov. 10, 1997, 1 pg.

Press Release "Atreve Delivers WEBSPECTIVE™ 1.5, the Leading Solution for Managing Business–Critical Web Applications," Nov., 10, 1997, 3 pgs.

Aldrich, S. "Atreve Delivers Web Application Service Level Management," Internet Tools and Technologies Service—e–Bulletin, Nov. 3, 1997, 4 pgs.

Press Release "Atreve Software, Inc. Names Glenn D. House President and CEO," Sep. 29, 1997, 3 pgs.

Wilson, T. "Managing Access To E–Commerce Sites," Internet Week, Sep. 1, 1997, 3 pgs.

Rodriguez, K. "Atreve Provides Multiserver Web Management," Inter@ctive Week, Jul. 21, 1997, 1 pg.

LAN Times, "A certain level of service," LAN Times Online, Jul. 21, 1997, 1 pg.

Atreve Software, Inc. "WebSpective LA Installation and User's Guide," Jul. 16, 1997, 72 pgs.

Atreve Software, Inc. "Interceptor 1.0 Installation and User's Guide," Jul. 16, 1997, 36 pgs.

Kerstetter et al. "Raising Web Analysis Bar," PC Week, Jun. 30, 1997, 2 pgs.

Kerstetter et al. "Raising Web Analysis Bar," PCWeek Online, Jun. 27, 1997, 2 pgs.

Atreve Software, Inc. "Web Application Management: Quality of Service is Job One," Jun. 24, 1997, 11 pgs.

Wilder, C. "Atreve Beta Manages Web Apps—WebSpective aimed at high–volume sites," Information Week, Jun. 23, 1997, 1 pg.

Wilder, C. "Atreve Beta Manages Web Apps—WebSpective aimed at high–volume sites," Information Week Online, Jun. 23, 1997, 1 pg.

Cox, J. "Atreve relieves taxed Web sites," Network World, Jun. 23, 1997, 2 pgs.

Press Release "Atreve Software, Inc. Formed to Address Challenges Associated with Managing Business–Critical Web Applications," Jun. 23, 1997, 3 pgs.

BMC Software, Inc., http://www.bmc.com/, printed on Jul. 31, 1998, 43 pages.

Bright Tiger Technologies, http://www.brighttiger.com/Default.htm, printed on Jul. 30, 1998, 63 pages.

"Intranet Load–Balancing Solutions," *Infoworld*, Mar. 23, 1998, vol. 20, Issue 12, http://www.infoworld.com/cgi–bin/displayArchive.pl?/98/12/intrsola.dat.htm, printed on Aug. 4, 1998, 28 pages.

Patrol Architecture—Raising the Application Management Standard, http://www.bmc.com/products/pat/amo/patwp.html, printed on Jul. 27, 1998, 21 pages.

Resonate, Inc., http://www.resonate.com/, printed on Jul. 30, 1998, 31 pages.

* cited by examiner

NON-FIREWALLED

IDEAL FIREWALL

ONE-WAY FIREWALL

| | WEIGHTED LOAD METRIC | INTERVAL WIDTHS | INTERVAL START-END |
|---|---|---|---|
| A | 1500 | 0.150 | 0.000 - 0.150 |
| B | 2250 | 0.225 | 0.151 - 0.375 |
| C | 3250 | 0.325 | 0.376 - 0.600 |
| D | 2000 | 0.200 | 0.601 - 0.800 |
| E | 1000 | 0.100 | 0.801 - 0.900 |
| F | 1000 | 0.100 | 0.901 - 1.000 |

# WEB SERVICE

TECHNICAL FIELD

This invention relates to managing web servers and, more particularly, to a web service system that allows a system operator to manage multiple web servers.

BACKGROUND INFORMATION

Web servers are used to respond to user's web page requests. A web server monitors one or more computer network address/port endpoints for web page requests and responds to the web page requests sent to an endpoint by transmitting web pages to the requester. Such web servers may be implemented with a software program running on a general purpose computer. The service capacity of a web server limits the number of web page requests that may be received and responded to.

For web applications that generate a significant amount of requests, web page application providers may use two or more web servers. Each web page request may be directed towards one of the web servers, and that one of the web servers responds to that web page request. In this way the requests are divided among the web servers. The web page requester may or may not have knowledge that there are a plurality of web servers responding to requests for a particular application.

In one web service system, the requester has knowledge that the application is available from more than one web server. The requester selects a web server, and requests a web page from that server. The web server responds to that web page request by providing a web page. This system has the disadvantage of requiring that the requester be aware of the various web servers. It has the additional disadvantage of having the web server selection be out of the control of the web service system.

In another system with multiple web servers, the domain name system ("DNS") that is in use in the Internet may be used to divide requests among a plurality of web servers. In normal use, a DNS server is used to match a web server name with a network address/port endpoint. A DNS request provides the DNS server with the name of a web server, and the DNS server responds with the network address/port endpoint of that web server. In the web service system that uses a DNS server to distribute requests to multiple web servers, when a web server name is submitted to the DNS server, the DNS server responds with one of the several address/port endpoints associated with the multiple web servers. In this way, DNS requests with the same DNS name may be responded to with different web servers having different network address/port endpoints. In this way, the DNS server can divide the requests among the servers. This has the advantage of not requiring the requester to have knowledge of the web service system architecture. One disadvantage of this system is that the DNS server must do more work than usually required to match names with endpoints, and this extra work may decrease the throughput of the DNS server. Another disadvantage is that the DNS server may not know how many web page requests are associated with a DNS request. Each response of the DNS server may be cached in other DNS servers for some period of time, and so one DNS request response may result in an unpredictably large number of web page requests being directed to the one web server, and that server may become overloaded.

SUMMARY OF THE INVENTION

In one aspect, the invention features a system for managing one or more web servers. The system includes a traffic management subsystem for distributing web page requests to the web servers. The system also includes a monitor for collecting and storing information related to the requests for web pages. The system also includes an identifier for identifying problems with the web servers.

Embodiments of this aspect of the invention can include the following features. In one embodiment, the traffic management subsystem includes an interceptor receiving web page requests and distributing the web page requests to the web servers based on the load on the web servers. In another embodiment, the web servers are capable of redirecting requests based on the load on the web servers. In another embodiment, the traffic management subsystem includes a manager for receiving web server load information and communicating the web server load information to the interceptor. In another embodiment, the traffic management subsystem includes an agent for directing the web servers.

In another embodiment, the manager directs the agent to direct one of the web servers to redirect requests. In another embodiment, the web servers run on hosts, and each host includes an agent that is in communication with at least one of the web servers on the host and each agent is also in communication with the manager.

In another embodiment, the monitor includes a manager receiving web page request information and storing the web page request information in a database. In another embodiment, the manager receives web page request information from the one or more of the web servers. In another embodiment, the manager receives web page request information from one or more agents each in communication with at least one of the web servers. In another embodiment, the web page request information is stored in a relational database. In another embodiment, the system also includes a console for displaying information to a system operator. In another embodiment, the includes a console that is capable of alerting the system operator to events. In another embodiment, the console is capable of retrieving the web page request information from the database and displaying the web page request information to the system operator.

In another embodiment, the identifier includes a manager that receives web page request information and stores the request information in a database. In another embodiment, the manager receives notification of events indicating problems with one of the web servers. In another embodiment, the events received by the manager are sent by an agent. In another embodiment, the manager is capable of taking corrective action in response to notification of events indicating problems with one of the web servers. In another embodiment, the manager notifies a system operator upon the occurrence of an event. In another embodiment, the manager notifies a system operator when automatic corrective action taken in response to an event caused by a problem does not resolve the problem. In another embodiment, the system includes a version controller for updating web pages on the web servers.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DESCRIPTION

I. Overview

A system for serving web pages has a plurality of web servers and provides a system operator with features and tools to coordinate the operation of the multiple web servers. The system can manage traffic by directing web page requests to available web servers and balancing the web page request service load among the multiple servers. The system can collect data on web page requests and web server responses to those web page requests, and provide reporting of the data as well as automatic and manual analysis tools. The system can monitor for specific events, and can act automatically upon the occurrence of such events. The events include predictions or thresholds that indicate impending system crises. The system can include crisis management capability to provide automatic error recovery, and to guide a system operator through the possible actions that can be taken to recover from events such as component failure or network environment problems. The system can present current information about the system operation to a system operator. The system can manage content replication with version control and data updates. Some or all of this functionality can be provided in particular embodiments of the invention.

Figure 1:
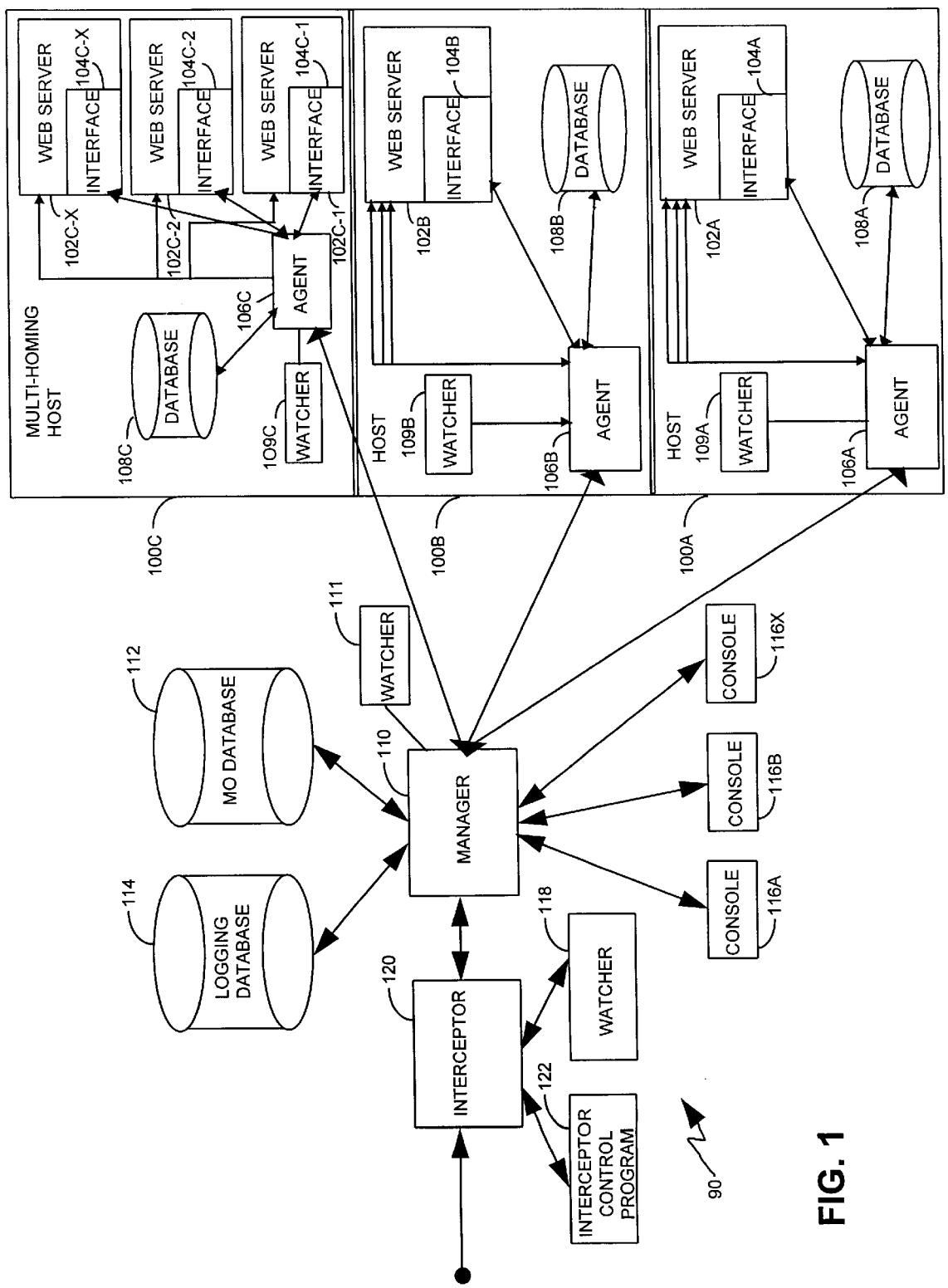
FIG. 1 is a block diagram of an embodiment of a web service system according to the present invention.

Referring to FIG. 1, a web service system 90, includes various components 100–122. The various components 100–122 of web service system 90 can communicate over one or more computer networks. The physical location of the components 100–122 does not impact the capability or the performance of the system, as long as the communications links between the various components have sufficient data communication capability. The web service system 90 can function across firewalls of various designs, and can be configured and administered remotely.

The web service system 90 manages one or more hosts 100. Three hosts 100A, 100B, 100C, which are shown as an example. An embodiment of the web service system 90 can have any number of hosts 100. Each host 100 can be a computer system commercially available and capable of using a multi-threaded operating system such as UNIX or Windows NT. Each host 100 can have at least one network connection to a computer network, for example the Internet or an intranet, or any other network, that allows the host 100 to provide web page data in response to web page data requests. Each host 100 includes at least one web server, shown in the figures as 102A, 102B, 102C-1, 102C-2, . . . , 102C-x, and generally referred to as web servers 102.

The web server 102 can be any web server that serves web pages in response to web page requests made over a computer network. In this context, a web page is an electronic document that can be made available on a computer network such as the World Wide Web in response to a web page request. An example of a web page is a data file that includes computer executable or interpretable information, graphics, sound, text, and/or video, that can be displayed, executed, played, processed, and/or stored and that can contain links, or pointers, to other web pages. Two examples of such web servers are commercially available as the Netscape Enterprise Server™ and the Microsoft Internet Information Services Server™. The web server 102 is capable of receiving web page requests from web clients, also referred to as browsers. A web page request from a browser can also be referred to as a "hit." The browsers can be operated by users, making web page requests. Browsers can also be operated by a computer or computer program, and make requests based on the computer's programming. The web page requests can be made using hypertext transfer protocol ("http") format, and also can be made using other protocols that provide request capability. Often the web page requests are part of a series of communications with the web server 102 involving several requests and responses, referred to as a session. The user interacts with a web server 102 by making an initial request of the web server 102, which results in the web server 102 sending a web page in response. The web page can contain information, and also pointers to other requests that the user can make of the web server 102. Sometimes the requests are for information that must be retrieved from a database. Sometimes the request includes information to be stored in a database. Sometimes the request requires processing by the web server 102, or interaction with another computer system. Sophisticated web servers and browsers can interact in various ways.

An aggregation of related web pages presented to a user as a set of web pages about a related topic, or from a particular source, usually, but not always from the same web server 102, is referred to as an application. One example of an application is a set of pages providing information about a company. Another example of an application is a series of pages that allow a user to conduct transactions with her savings bank. Two sets of web pages can be considered a single application, or they can be two separate applications. For example, a set of web pages might provide information about a bank, and a customer service set of web pages might allow transaction of business with the bank. Whether a set of web pages is considered to be one application or several applications is a decision made by the application designer.

The web service system 90 is capable of delivering one or more applications to users. The web service system 90 can be configured so that some subset of the web servers 102 exclusively serve a single application. In one embodiment, some web servers 102 serve a subset of the available applications, and other web servers 102 can serve to other applications. In another embodiment, all web servers 102 serve all available applications.

The web pages presented to the user in response to web page requests from the user's web browser can be stored on the host 100 or on a file system accessible to the web server 102, or they can be generated by the web server 102 by processing data available to the web server 102. For example, for web pages documents about a topic, the web pages can be written (designed) and stored in the web server 102 file system. In response to a web page request, such a web page can be sent to the user just as it is stored in the file system. In a banking transaction system, however, it is likely that information about the user's bank account will be stored in a database. The web server 102 can generate a web page containing the user's account information each time the user requests the page. Often, web pages are stored partially in the file system, and partly are generated by the web server 102 when the request is made.

Various techniques are used to store status information, also referred to as the "state" of a user's session with the web server 102. The user can develop a state during her interaction with the web server 102 via the requests made to the web server 102 and the web pages received in response to those requests. The user's state can, as one example, include information identifying the user. As another example, the state can include information specifying web pages the user has already requested, or the options the user has selected in her interaction with the system. As another example, the state can include items the user has selected for purchase from a commercial sales application. Generally some information about the state of the session is stored in the client web browser, and some information can be stored in the web server 102.

A host 100 can have any number of web servers 102 running on it, depending on host capacity, performance, and cost considerations. In one embodiment, the host 100A includes one web server 102A. In another embodiment, host 100C includes a plurality of web servers 102C-1, 102C-2, . . . 102C-X. The one web server 102A on host 100A and the three web servers 102C-1, 102C-2, and 102C-x on host 100C are illustrative examples and are not intended to limit the number of possible web servers 102. Each web server 102 monitors at least one network address and port, also referred to as an endpoint. A particular address and port is called an endpoint because it is a virtual point for communication—a network connection is made between one address/port endpoint and another. A web server 102 receives requests directed to one of its endpoints and responds to those requests with data in the form of web pages.

A web server 102 that accepts requests at multiple network address/port endpoints can perform as if it were a plurality of distinct web servers 102 even though it is actually implemented as one web server 102. Such a web server is referred to as a multiple endpoint web server. For the purposes of this discussion, a multiple endpoint web server can be described as if it were in fact multiple web servers 102 with each web server 102 receiving requests on a network address/port endpoint. In one embodiment, such a multiple endpoint web server has one web server interface 104 that is the interface for all of the multiple endpoints.

Each web server 102 can have associated with it a web server interface, generally referred to as 104. The web server interface can be a plug-in, filter, or other software associated with the web server 102, and serves as an interface between the web server 102 and other components of web service system 90. In this context, the term web server interface is distinct from the network interface that can be present on the host 100. For example, web server 102A has web server interface 104A, web server 102B has web server interface 104B, web server 102C-1 has web server interface 104C-1, web server 102C-2 has web server interface 104C-2, and web server 102C-x has web server interface 104C-x. Each web server interface 104 can communicate with an agent, generally referred to as 106 on each host 100.

A host 100 can include an agent 106. The agent 106 provides the web service system 90 interface with the host 100. The agent 106 links the web server interface 104 with the web service system 90. The agent 106 also links the host 100 with the web service system 90. Even on a host, such as host 100C, which has multiple web servers 102C-1, 102C-2 . . . 102, there is generally only one agent 106 running on the host 100. Each agent 106 has access to a database 108, which contains information about the system components.

Each agent 106 on each host 100 can be in communication with a web service system manager 110. The manager 110 receives information from the agents 106 about the status of the hosts 100 and the web servers 102. The manager 110 can send commands to the agents 106 to configure the hosts 100, to start, stop, or pause the web servers 102, and to manage the load on the web servers 102. The manager 110 has access to a logging database 114 that is used for logging system activity and events. The manager 110 also has access to a managed object database 112, used for storing information about the various components of the system. The manager 110 is also in communication with one or more consoles 116A–116X, generally referred to as 116. The consoles 116 provide a user interface for the system operator. The system administrator can monitor the status of the system and configure the system via a console. The manager 110 can be run on the same host 100 as other web service system 90 components, such as one of the web servers 102 or an interceptor 120, or on another computer of sufficient capacity.

The manager 110 can be in communication with an interceptor 120. The interceptor 120 can receive information and commands from the manager 110. The interceptor 120 can also receive information and commands from an interceptor control program 122. The interceptor control program can be on the same computer system as the interceptor 120, or alternatively it can run on another system.

Part of the management capability of the web service system 90 is accomplished by monitoring the web page requests made of the web servers 102 and the resulting load on the web servers 102 and the hosts 100. Requests can be directed and redirected to balance the load among the web servers 102. In one embodiment, the interceptor 120 is the point of first contact for a user. The interceptor 120 receives a web page request from a user and "refers" the user's web browser to an appropriate web server 102 for that request. The user's web browser is referred by responding to the web page request with a referral to web page on an appropriate web server 102. This referral capability can be accomplished with a capability incorporated into the hypertext transfer protocol, but can also be accomplished in other ways. The user may or may not be aware that the web browser has been referred to an appropriate web server 102. The user accesses the application on that web server 102 and receives responses to its web page request from that web server 102. In one embodiment, if a web server 102 becomes overloaded, that web server 102, under the direction of the manager 110, can refer the user to another web server 102 capable of delivering the application.

II. Interceptor

An interceptor 120 receives requests from users and redirects the user's requests to web servers 102. In one embodiment, the interceptor 120 is used to redirect all users to one web server 102, such as another interceptor 120 or a single endpoint. In this manner, the interceptor 120 acts as a shunt, meaning it directs all requests directed towards one or more web servers on a host to another web server 102. In another embodiment, the interceptor 120 receives status information from the manager 110 and uses that information to redirect users. The status information includes server availability and load, administrator's changes, and application or web server 102 start and shut down actions. The primary design goals in implementing the interceptor 120 are turnaround speed and security. The interceptor 120 is often front door to the system, and so its performance affects the perceived performance of the entire web service system 90. It may be useful to locate the interceptor 120 as close, in the network topology sense, to the backbone as possible. It is then necessarily the most exposed component of the web service system 90.

In one embodiment, the interceptor 120 is implemented in hardware. In another embodiment, the interceptor 120 is a software program running on a host computer. In one software embodiment, the interceptor 120 is a standalone program that runs on a server-class computer capable of running a multi-threaded operating system. Under UNIX, for example, the interceptor 120 can run as a daemon. Under Windows NT™, the interceptor 120 can run as a service.

Figure 2:
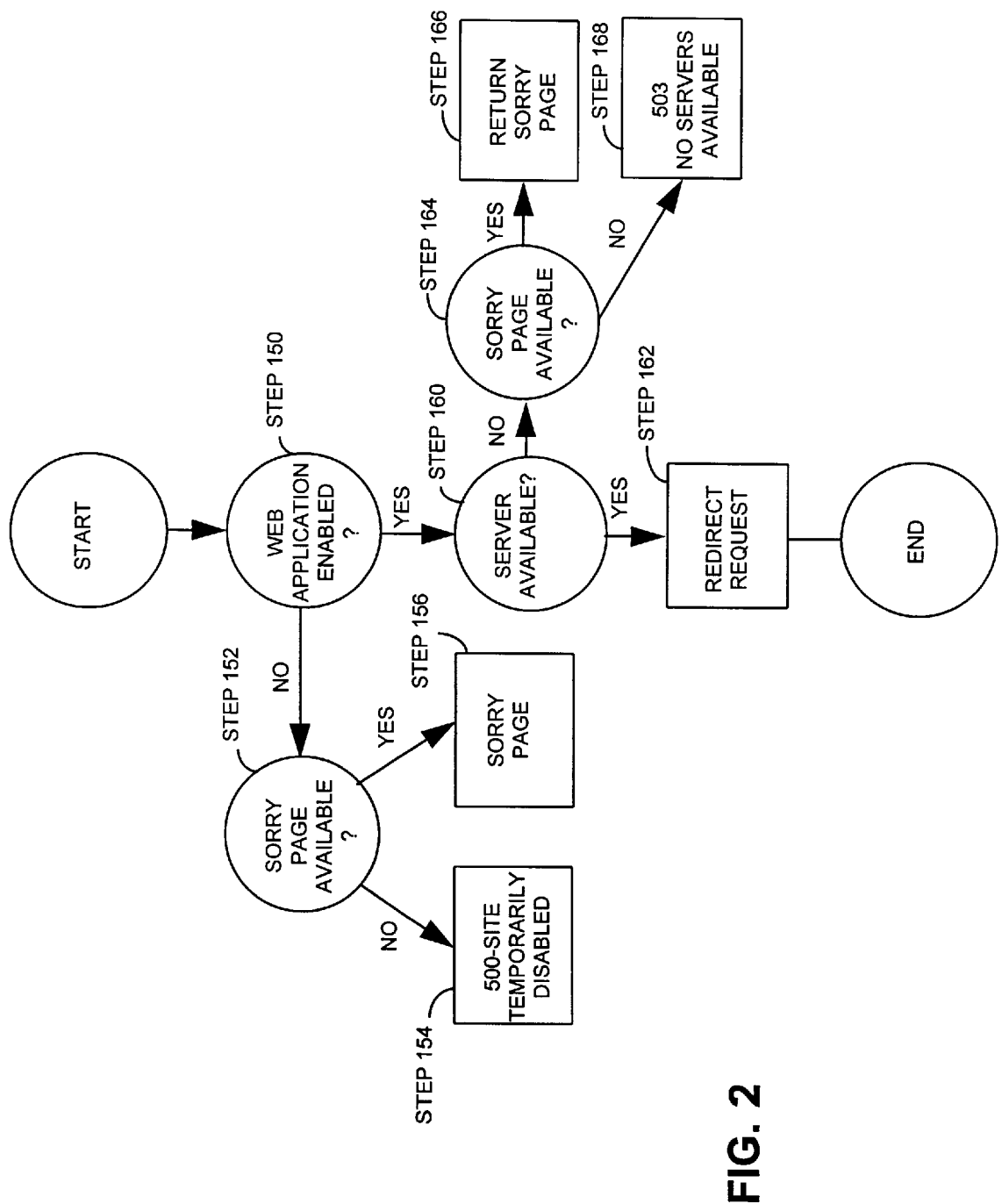
FIG. 2 is a flowchart describing the processing that occurs when an embodiment of the interceptor of FIG. 1 receives a request.

Referring to FIG. 2, in normal operation, the interceptor 120 receives a request from a user for a web page. The interceptor 120 first determines if the requested application is enabled (Step 150). If the application is not enabled, the interceptor 120 determines if a sorry page is available (Step 152). If a sorry page is available, the sorry page is sent (Step 156). If a sorry page is not available, a default sorry page is sent, which indicates that the site is temporarily disabled.

If the application is enabled, the interceptor 120 checks to see if a web server 102 is available (Step 160). If there is a web server 102 available, an available web server 102 is selected, and the user is redirected to that web server 102 with a redirect request (Step 162). In one embodiment, the available web server 102 is chosen based on the servers' load. If no web server 102 is available, the interceptor 120 will either return the sorry page (Step 166) or a 503 error indicating that no servers are available (Step 168).

In one embodiment, the interceptor 120 is configured with information about each application for which it is responsible. The configuration includes: the network address/port endpoint at which the interceptor 120 can receive requests for the application; a flag that indicates whether the application is enabled; a list of web servers 102 that can provide the application secure redirection information, including whether secure connections should be accepted, and the network address/port endpoint secure communications will use; a pointer to a sorry page, if any; and a limit of the number concurrent threads that should be used for that particular application. In one embodiment, the interceptor 120 is configured with information about each web server 102 that can provide each application. The information about each web server 102 includes: whether or not the server is currently running; a measure of the load-per-request for the server that can be used for load balancing; the network address/port endpoint for that web server 102; and the relative performance power of the web server 102. It can also have the current load on the web server 102, and the time the load was last updated.

In one embodiment, the interceptor 120 is started by a watcher 118, which runs on the same computer as the interceptor 120. The interceptor 120 runs as a child process of the watcher 118. The watcher restarts the interceptor 120 process if it suddenly ceases to run due to hardware or software error, or if the interceptor 120 needs to reload its configuration parameters.

Upon startup, the interceptor 120 reads its configuration file. It attempts to contact the manager 110. Any user requests that are received before contact with the manager 110 is possible can be redirected using the last status information the interceptor 120 received, or using preconfigured defaults, or some combination. Once a connection to the manager 110 is made, the interceptor 120 registers with the manager 110 for updates. An update is immediately sent upon registration. If a connection to the manager 110 is not made, either because of firewalls, error conditions, or because the manager 110 has not yet started, then the interceptor 120 will attempt to contact the manager 110 at defined time intervals and will handle user demand using static (default) status information.

In one embodiment, the manager 110 sends data and commands to the interceptor 120: The manager 110 can provide the interceptor 120 with load data for each web server 102. The manager 110 can add or remove an application as part of a change in system configuration, or enable or disable an application for temporary adjustment. The manager 110 can add or remove a particular web server 102 as part of a change in system configuration, or enable or disable a web server 102, so that the interceptor 120 does or does not forward users to that web server 102. The manager 110 can assign a performance strength value to a web server 102, and also other load balancing values. The manager 110 can change the thread count associated with an application, thereby limiting the number of threads (in a multi-threaded software sense) of the interceptor 120 available to respond to requests for the application. The manager 110 can change the sorry page associated with an application. The manager 110 can also command the interceptor 120 to shutdown.

Load Balancing

The interceptor 120 maintains a running approximation of the load on each web server 102. This load estimation can be based on data periodically received from the manager 110 and/or can be based on static default values. The distribution of requests is described further in Section IX, Choosing a Web Server.

Interceptor Control Program

The interceptor control program 122 can be used in embodiments where a manager 110 is not included in the system or is temporarily unavailable. In such embodiments, the interceptor control program 122 is used to direct the activities of the interceptor 120. The system operator can control the interceptor 120 by sending the commands and information described above as coming from the manager 110. In another embodiment, the interceptor control program 122 can also be used in addition to the manager 110, to provide another mechanism to control the interceptor 120.

III. Agent

Figure 3:
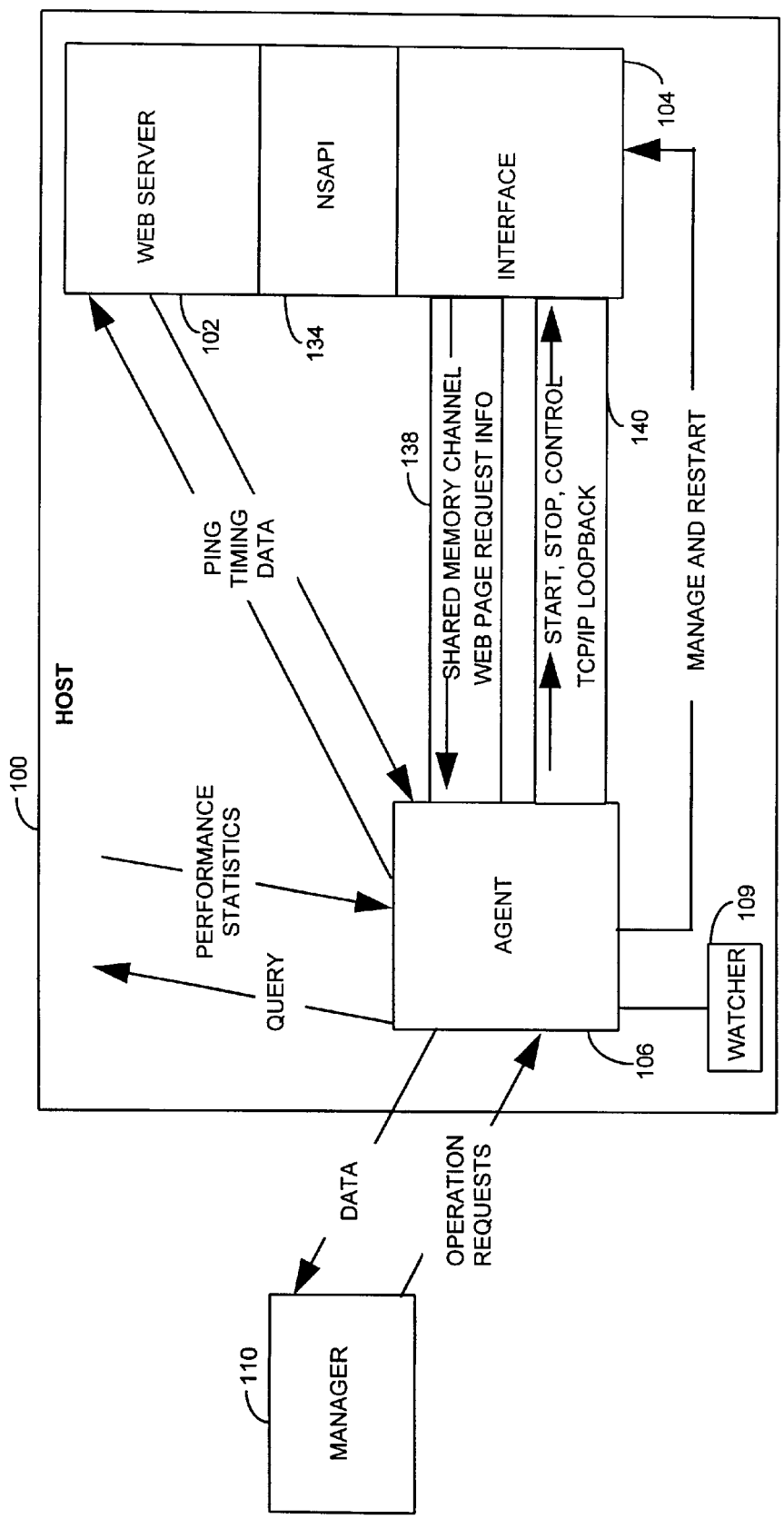
FIG. 3 is a more detailed block diagram of an embodiment of the host and the manager of FIG. 1.

Referring to FIG. 3, an agent 106 serves as an intermediary between the manager 110 and any other software running on the host 100, including the operating system. In one embodiment, the agent 106 is implemented in software using the Java programming language. The agent 106 can run in the background. On a UNIX system, it can run as a deamon, on Windows NT, it can run as a service. There is usually only one agent 106 running on each host 100. The agent 106 is in communication with the one or more web servers 102 on that host 100 via the web server interface 104 associated with each web server 102. The web server interface 104 provides the agent 106 with information from the "back end" of the web server 102. The web server interface 104 provides such information about the web page requests received from users, and the pages sent in response to the requests.

In one embodiment, communication from the web server interfaces 104 to the agent 106 takes place over shared memory channel. The agent 106 reserves shared memory, and the web server interfaces 104 are able to write data into the shared memory. This has the advantage of being faster than using sockets, and allows the agent 106 to receive data from all web server interfaces 104 at one buffer. This communication link could also be implemented with sockets or other interprocess communications.

In one embodiment, the agent 106 uses a socket to send commands to the web server interfaces 104. The agent 106 can also send requests directly to the web server 102. The agent 106 can also communicate with the manager 110, and pass along to the manager 110 information received from web server interface 104.

The agent 106 is invoked by a watcher 109 as a child process of the watcher 109. The watcher 109 can restart the agent 106 if the agent 106 ceases operation due to software or hardware failure, or if the agent 106 needs to reload startup configuration parameters. The startup parameters can include the network address/port endpoint of the manager 110, a security file, the location of a database 108 containing other configuration information, the network address/port endpoint where the agent 106 can listen for messages from other system components.

Interaction with Manager

Upon initialization, the agent 106 will attempt to contact the manager 110 to register itself. The agent 106 can contact the manager 110 to notify the manager 110 of events, such as when processes start or stop. The agent 106 can also communicate to the manager 110 information about the requests received by the web servers 102. This information can be used to monitor the performance of the web servers 102.

The manager 110 can send commands or requests to the agent 106 for the agent 106 itself or for the agent 106 to pass onto the other components on the host 100. The manager 110 can add or delete a new web server 102, and can configure the agent 106 to act appropriately based on the change. The manager 110 can retrieve or change the configuration of the agent 106, or the other components on the host 100. The manager 110 can send a test message to the agent 106 if it has not received any messages for a predetermined time. For example, the manager 110 can send a short message requesting a response indicating that the agent 106 is operating. Often the response is an echo of the message. The manager 110 can request a full list of the state of the agent 106. In one embodiment, the manager 110 can also request a list of recent events. Such a list is useful if a manager 110 that has just started is introduced to a running agent 106, for example when a manager 10 has inadvertently failed and been restarted, or when communication has been disrupted. In another embodiment, the agent 106 will automatically periodically send a list of events to the manager 110. If a connection between the agent 106 and manager 110 inadvertently fails, the agent 106 will automatically save the events, and when communication is resumed, send all the events that have been saved to the manager 110.

The agent 106 sends web page request information to the manager 110. In one embodiment, data packets containing web page request information are sent to the manager 110 in groups of 100 requests. In another embodiment, data is sent to the manager 110 whenever a buffer containing the data, for example a 4k or 8k buffer, is full. In another embodiment, data is sent to the manager 110 at a periodic time interval, for example, every 30 seconds. In another embodiment, the data is sent whenever a buffer containing the data is full or at a periodic time interval, whichever comes first. Various information can be included with regard to each request. The information provided by the web server interface 104 about each web page request can be passed on to the manager 110. This information can include the information listed in Table 3. The manager 110 can instruct the agent 106, and the agent will instruct the web server interface 102, to send some or all of the information included in Table 3.

The agent 106 can provide to the manager 110 certain information about each web page request that was passed to it by a web server interface 104. For example, the agent 106 can provide information about the time; in microseconds, between the time the request was first received, and the time the response is completed. The agent 106 can also pass information that it has generated. For example, the agent 106 can indicate the number of requests in the queue at the time the request is responded to. The agent 106 can indicate whether the web server 102 responded appropriately to a test web page request. If the agent 106 sent a test web page request that requires use of database and other processing to serve the web pages, the indication of appropriate response to the test web page indicates that the database and other processing is functional.

The agent 106 can also provide to the manager 110 information about the host 100. This information can include static configuration information and dynamic performance statistics. The configuration information can be used to identify the host machine and its components, and includes the information shown in Table 1.

TABLE 1

Host Configuration Information

1. A unique identifier for the host.
2. The name of the operating system (i.e., SunOS or WIN32_WINDOWS)
3. The name of the host as returned by "uname" on UNIX or gethostname( ) on NT.
4. The operating system release string (i.e., 5.5 on solaris or 4.0 Build 1357 on NT)
5. The operating system version (i.e., Generic on solaris or Service Pack 1 on NT)
6. The class or type of machine (i.e., sun4c)
7. The machine's processor architecture (i.e., sparc, Intel, Power PC, Alpha)
8. Machine platform (i.e., Sun_4_75, SUNW or AT)
9. Hardware Provider
10. An enumeration of Network interface(s). The information includes broadcast address, IP address, name (interface name, many include the driver name), subnet mask, default gateway (NT only) and interface flags (UNIX only)
11. An array of physical network interfaces.
12. The names of available disks (i.e., sd0, "C.")
13. The number of processors that are online.
14. The number of processors configured.
15. Magabytes of physical memory in the system.
16. An enumeration of the disk partitions mounted on the system. This will include mount point, name, type (i.e., ufs, fixed remote), mount at boot (not used on NT), mount options (not used on NT).

Performance information can be captured periodically by the agent 106, and can be used to monitor load on the web service system 90. Performance information can be used to identify bottlenecks in an application, host, or component. Performance information can be used to estimate future resource requirements based on current or historical load. Performance information available can be system dependent. As shown in Table 2, for example, different performance information is available for UNIX and Windows NT systems.

TABLE 2

Performance Statistics

| System | Component | Statistics |
|---|---|---|
| UNIX | Physical Disk | Read/Write Operations, Read/Write Amounts, Run Rates, Wait Rate, Service Time |
| UNIX | Network Interface | Incoming Packets, Outgoing Packets, In errors, Out errors, Collisions |
| UNIX | Processor | Mutex Adenters, System Time, User Time, Wait Time, Idle Time |
| UNIX | System | Run Queue, Runable Count |
| UNIX | Memory | Free Swap Space (re Bytes), Allocated Swap Space (re Bytes), Available Swap Space (re Bytes), Pages Scanned |
| UNIX | Logical Disk | Free Space (re Bytes), partition Size (re Bytes), Available Space (re Bytes), Space In Use (re Bytes), Errors |
| Windows NT | System | Percent Total Processor Time, Percent Total User Time, Percent Total Privileged Time |
| Windows NT | Processor | Percent Processor time, Percent User Time, Percent Privileged Time |
| Windows NT | Memory | Available Bytes, page Faults/sec, Pages/sec, pages Input/sec, Page Reads/sec, Pages Output/sec, page Writes/sec, Pool Nonpaged Bytes |
| Windows NT | Logical Disk | Percent Free Space, Free Megabytes, Current disk Queue Length, Percent Disk Time, Average disk Queue Length, Average Disk Time/Transfer, Disk Transfers/sec, Disk Bytes/sec, Average Disk Bytes/Transfer |
| Windows NT | Network Segment | Total Frames Received/sec; Total Bytes Received/sec; Percent Network Utilization |
| Windows NT | Network Interface | Packets Received/sec, Packets Sent/sec, current Bandwidth, Bytes Received/sec, Packets Received Errors, Bytes Sent/sec, Packets Outbound Errors |
| Windows NT | TCP | Connections Established, Connections Active, Connections passive, Connection failures, Segments Sent/sec, Segments Retransmitted/sec |

If the manager 110 fails, the agent 106 will repeatedly attempt to contact it. The agent 106 will wait a predetermined time between attempts. The agent 106 will still log events to a log file on local host 100, but request data and performance data can be lost. When the manager 110 recovers, it can request the list of the state of the agent 106, and a list of events such as process failures.

Interaction with Web Server Interface

Each web server interface 104 transmits over a shared memory communications channel to the agent 106 on the same host 100 information about each web page request as it is processed. The agent 106 is responsible for consuming, processing, and forwarding this data at a sustained rate. If the consumption rate is slower than the transmission, the information can fill the shared memory buffer channel. For example, in one embodiment, the consumption rate is 25 ms/request and the request response rate is 20 ms/request. If the request response rate increases to faster than 25 ms/request, or if the agent consumption rate slows to less than 20 ms/request, the buffer will overflow. The web server interface 104 will log the overflow event, and discard further data until space in the shared memory channel is available.

The data passed from the web server interface 104 can include the information on each web page request shown in Table 3. The agent 106 can specify which information, if any, should be sent. The information on each web page request can include an accompanying list indicating which information is included. In one embodiment the accompanying list is a bit field, with each bit indicating one particular item of information. For example, each bit in the bit field can indicate that one particular item in Table 3 is included in the information.

TABLE 3

Information on Each Web Page Request

1. The web server endpoint, i.e. the address/port, indicating which web server received the request.
2. The requesting browser's endpoint, i.e. the address/port.
3. The host name of the requesting computer, for example the DNS entry.
4. The username as provided by the requesting browser.
5. The type of user authentication used, including whether a correct password was entered.
6. The file system path to the authentication database used to authenticate.
7. The complete request made by the user, including scripting, CGI, or other similar parameters.
8. The file system path to the content requested (no CGI, or other similar parameters).
9. The types of files accepted by the requesting browser, as provided in the transfer protocol headers.
10. The transfer protocol commands sent by the client, for example GET and PUT.
11. The type of browser, software, or robot requesting the content as provided in the transfer protocol header.
12. The transfer protocol connection parameter, including null, close, or the non-standard Netscape feature to keepalive sockets.
13. The transfer protocol pragma header, if included in the request.
14. The transfer protocol status, which can be a number, a space, and a user-readable string.
15. The type or version of transfer protocol, for example HTTP/1.1.
16. The last modification date of the content.
17. The length of the content in bytes.
18. The data format of the content.
19. The date/time at which the user request was initiated.
20. The amount of time required to retrieve the content.
21. The cookie(s) sent by the client.
22. The referring information indicating where the browser came from.
23. The referred location indicating where the browser was redirected to.
24. Abort information indicating whether the connection was aborted.

The agent 106 can open a network connection socket to communicate with the web server interface 104 via the loopback interface. The agent 106 can send commands and requests to the web server interface 104 over this connection. The agent 106 can specify to the web server interface 104 which web page request information included in Table 3 the web server interface 104 should send over the shared memory communications channel. The agent 106 can specify which pages information should be sent. For example, there may be some types of pages for which no information should be sent. The agent 106 also can specify a redirection target. The agent 106 can instruct the web server interface 104 to redirect traffic to a specified redirection target, if the redirection rules allow. The agent 106 can cancel redirection. The agent 106 can change the redirection rules used by a web server interface 104, and then command the web server interface 104 to reread the redirection rules. The agent 106 can send a test message to the web server 102 to determine if it is still operational. The agent 106 can request the process ID of the web server 102.

Interaction with Web Server

The agent 106 can send web page requests to a web server 102 located on the same or on a different host 100. The agent 106 can verify that the response to the web page request is accurate, thereby verifying the operability of the web server 102 and any associated scripts, processing, or databases. The agent 106 can measure the time for the web server 102 response to any particular web page request. Since the network delays associated with a request from the same host are minimal, the time measured should be only the time spent waiting for a connection and the time required for the web server 102 to process the request. This yields an accurate measurement of the web server 102 performance.

If the agent 106 sends a web page request to a web server 102 located on the same host 100 as the agent 106, the agent 106 can combine the information obtained by sending web page requests to the server with the information received from the web serve interface 104 associated with that web server 102 via the shared memory communications channel. By sending a web page request and monitoring the web server 102 resulting from that web page request actions on the "back end" of the web server 102, the agent 106 can determine such statistics as server queue delay, and server queue length. The server queue delay is the amount of time a request waits before it is processed by a server. The server queue length is the number of requests ahead of a request on the queue when the request is received by a web server 102. It is useful to determine the queuing delay and the queue length, because these measures relate to the load on a web server 102. For example, load can be balanced to minimize queuing.

Figure 4:
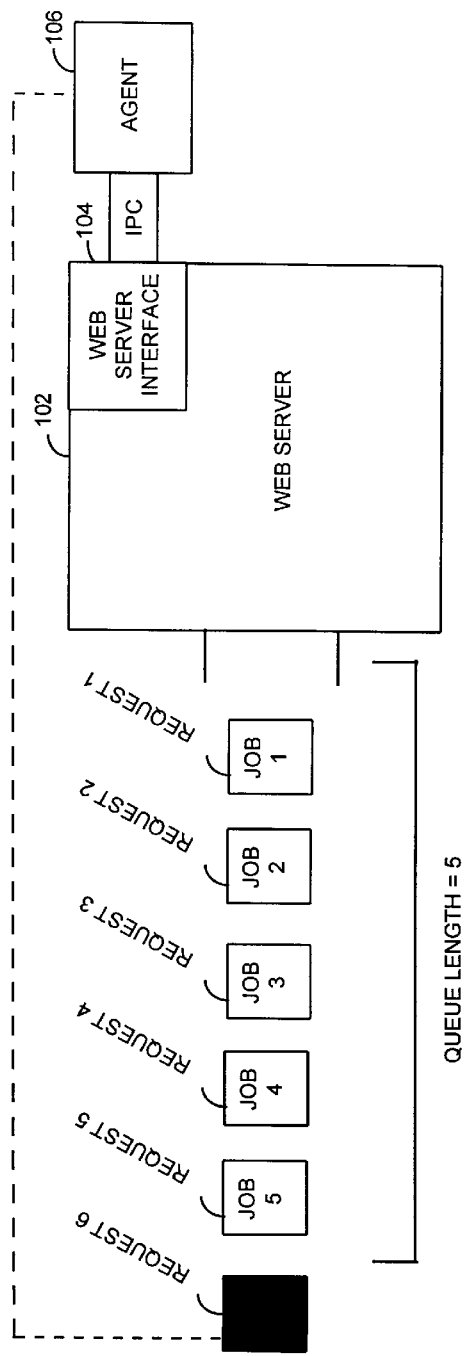
FIG. 4 is a block diagram depicting the determination of queue length in an embodiment of a web service system according to the present invention.

Referring to FIG. 4, the queue length can be determined by the agent 106 sending a web page request to the web server 102. Although at this point the agent 106 cannot determine how many requests are on the queue, the agent's request is shown in as Request 6. The agent 106 can monitor the information provided over the shared memory communications channel by web server interface 104 and count the requests processed by the web server 102. As the web server 102 processes Request 1 through Request 5, the agent 106 will receive that information. When Request 6, the agent's request, is reported by the web server interface 104, the agent 106 will stop counting, and will know that the number of requests waiting for processing when the agent's request was sent. In the example of FIG. 4A, the agent 106 will determine that there were five requests waiting for processing.

Figure 5:
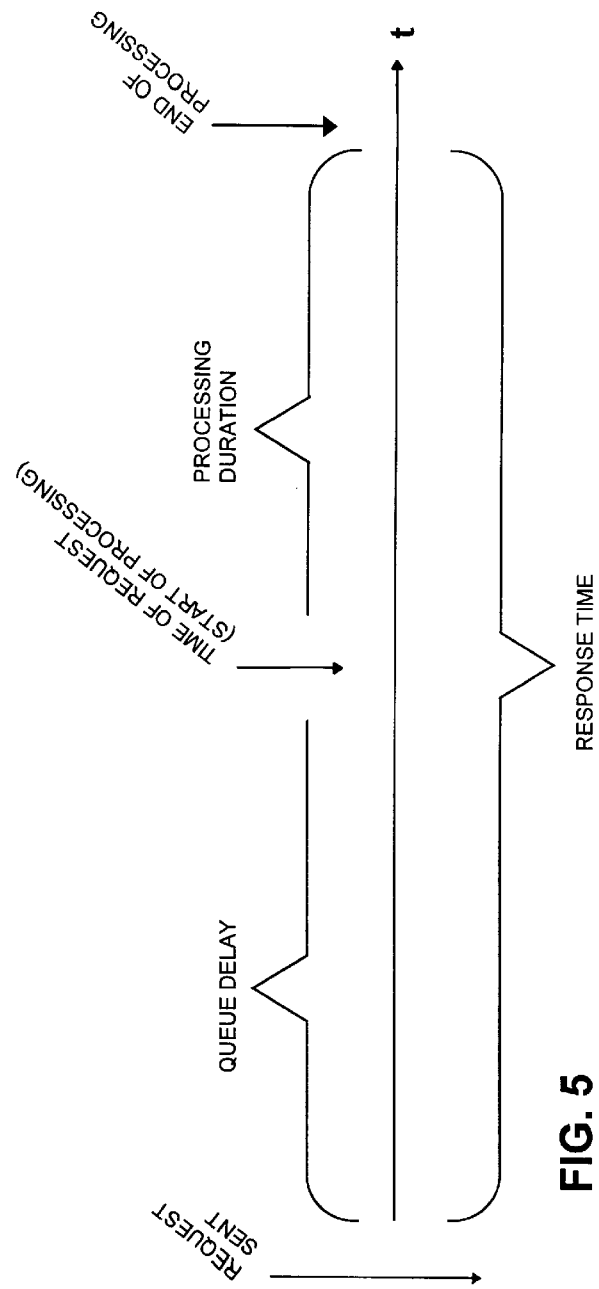
FIG. 5 is a graph of the response time of the web page request of FIG. 4.

Referring to FIG. 5, the agent 106 can determine what part of the web server's 102 total response time is spent queued for processing, and what part is sent being processed by the web server 102. This is possible because the agent 106 can receive the time of the request and the duration of the request from the web server interface 104. The amount of time from when the agent 106 sends a web page request until the time the request is first processed is the queuing time, and the time from start of processing is the processing time.

IV. Web Server Interface

Referring again to FIG. 3, the web server interface 104 provides an interface into the web server 102. The web server interface 104 passes information about web page requests to the agent 106 via the shared memory communications channel 138. The agent 106 sends commands to the web server interface 104 via a connection established on the loopback interface 140. These commands allow the agent 106, generally at the manager's request, to control redirection and logging, to start the web server 102 by creating a new process, and to stop the web server 102 by sending operating system signals, such as a "kill" signal, to the web server 102.

In one embodiment, the web server interface 104 is a shared library, such as dynamically linked libraries (DLL) files under Windows NT. In one embodiment, the libraries conform to the Netscape API ("NSAPI") 134. In another embodiment using Microsoft Internet Information Services™, the libraries conform to the Microsoft ISAPI. The code in the libraries is incorporated into the web server 102 operation via the NSAPI 134. The web server interface 104 is designed not to interfere with the operation of web server 102, and its ability to serve web pages, but to provide added functionality associated with the web service system.

At startup, the web server interface 104 opens shared memory channel 138 to the agent 106 to report the web page request information. It also spawns a thread to listen to a predetermined port on the loopback interface for commands from the agent 106. The commands are generally atomic, so that they can complete before new web page requests arrive. In this way, the changes will be consistent for each web page request.

When web page requests are directed to the web server 102, the web server 102 calls functions in the NSAPI 134 at various times during processing. For example, at the beginning and end of request processing, calls are made to web server interface 104 functions. This allows the web server interface 104 to store timing and other information related to the request. If the agent 106 has not commanded redirection then the web server 102 will serve the web page requested, and the web server interface 104 will send the web page request information over the shared memory channel 138. If the agent 106 has commanded redirection, the web server interface 104 will cause the web server 102 to redirect the request, if allowed by the redirection rules.

The redirection rules prevent redirection when there is some "state" stored at web server 102 associated with the user's session. For example, in a commerce application, if the user has a "shopping cart" containing items to purchase, redirection might cause those items to be lost. The shopping cart information, in that example, is the state that could be lost. If the state were stored in the web server 102, and the user was redirected before the items were purchased or discarded, the items would be lost if the user were redirected to another web server 102. The redirection rules prevent redirection from particular pages. In one embodiment, a list of pages is provided to the web server interface 104 for which the user has state stored at the web server 102, and should not be redirected. In another embodiment, the list is a list of pages from which redirection is allowed. In another embodiment, the pages are located in a particular location if the user has state, and in another location if they do not. In another embodiment, each page contains content that indicates whether the user has state associated with that page.

In one embodiment, in which the web server 102 is a Netscape™ web server, the web server interface 104 shared library files are placed in a predetermined directory. The obj.conf file, which is the Netscape™ web server 102 is modified to load the web server interface 104, and to insert calls to the web server interface 104 in appropriate places. For example, the "Init" section specifies web server interface 104 modules to be loaded when the server is initialized. This can be accomplished with the following command:

Init fn="load-modules" funcs="func1,func2,func3" shlib="C:/PATH/interface.dll"where func1, func2, func3 are the modules to load, and PATH is where the .dll file is located. Also, an initialization file is specified:

init fn="InitInterface" regfile="registryfile"; for UNIX or init fn "InitInterface" name="interface-name"; for Windows NT The NameTrans section can also be modified to include a reference to the web server interface 104. The web server interface 104 is thus able to capture and redirect, if so directed, each web page request. The first entry in the NameTrans and AddLog sections of the obj.conf files are thus modified:

NameTrans fn="InitialFunction"

and

AddLog fn="AddLogFunction"

Service calls can also be intercepted to utilize the web server interface 104. The service calls are routed through a passthrough that accomplishes the interface tasks along with the service call. This can be accomplished by modifying the obj.conf file to call the passthrough function. The obj.conf configuration is modified so that the line:

Service fn="imagewrap" method="(GET/HEAD) type="magnus_internal/imagemap"is modified to be:

Service fn="ServicePassThrough" ufn= "imagewrap" method="(GET/HEAD)"

type=magnus_internal/imagewrap"

Each web server interface 104 on a system has a unique name. The name is used in the registry to save the parameters associated with that interface 104. Each web server 102 included in the web service system has an associated web server interface 104. If the web server 102 is responsible for multiple network address/port endpoints, so is the web server interface 104. Each interface is configured with parameters including a communications channel identifier, to specify the communication link, such as the shared memory communications channel to be used to pass information on to the agent 106. Also configured is the list of web page request information to send to the agent 106 with each request. In one embodiment, this list is one or more data words, each bit symbolizing one of the items of information in Table 3. Also configured on the web server interface 104 is a rules file, which indicates what pages a user can be redirected from. In one embodiment, the rules file is a list of web pages from which a client cannot be redirected. The pages in the list are seen by the user only when the user has state. In other embodiments, other methods are used to determine whether redirection is permissible.

V. Manager

Referring again to FIG. 1, the manager 110 coordinates the components of the web service system. The manager 110 tracks the status of the components. The status can include the state of the components, such as whether a component is operational, and also how busy the component is The manager 110 can receive information from the agents 106 about the response of the web servers 102 and the load on the hosts 100. This information can be passed on to the interceptor 120 by the manager 110 to balance the load on the hosts 100. This information can also be logged, and used in later analysis of system performance. The information can also be passed on to the console 116 for observation and analysis by the system operator.

The manager 110 can stop and restart the agents 106. The manager 110 can inform components, such as the interceptor 120 and the agents 106 about changes in the configuration of the system. The manager 110 receives notification of events from the interceptor 120 and the agents 106, and can take automatic action, or can log the event, and can inform the user by signaling an alert to a console 116. In one embodiment, the manager 110 can also signal an alert by paging or otherwise communicating with a system operator.

Upon startup, the manager 110 attempts to open the logging database. In a UNIX embodiment, the name of the logging database is in a configuration file. In a Windows NT embodiment, the database name is in the NT registry. The manager 110 verifies that the necessary data tables are set up for logging, and if they are not, the manager 110 creates them. In this way the logging database is prepared to accept logging information. If a console 116 is running, the console 116 will attempt to contact the manager 110 until a connection is established. Any problems can be logged and reported to the administrative error reporting facility provided by the computer system on which the manager 110 is running. The manager 110 also attempts to open the object database 112. In a UNIX embodiment, the name of the object database is in a configuration file. In a Windows NT embodiment, the database name is in the NT registry. If the manager 110 is able to open the object database successfully, then the manager 110 will be able to determine the components present in the system. The manager 110 can attempt to contact each agent 106 and interceptor 120 present in the system to verify the state of those components.

If the state of the components matches the state in the object database 112, then the manager 110 will begin normal operation. If the manager 110 detects components that are in a different state, then the manager 110 may go off-line. The off-line mode allows the system operator to manually change the state of the components as stored in the object database. Alternatively, the manager 110 can be commanded to begin normal operation even if it is out of sync with the status of the components, and to attempt to synchronize with the component's current status, and command each component to change status if the current status is not appropriate.

In normal operation, the manager 110 will receive periodic information updates from each agent 106. The information updates can be logged, and can be relayed to a console 116, if so configured. The manager 110 extracts summary statistics from the agents 106 periodic information updates, and these summary statistics are passed on to the interceptor 120. In this way, the interceptor 120 has a recent view of the load on the various components of the system. Minor load variations can be compensated for by intelligently routing new requests to underused resources. The manager 110 can also compute extended time-frame summary statistics for a predetermined time period and transmit them to the interceptor 120. The extended time-frame summary statistics can be used by the interceptor 120 as default values, also referred to as static values, if communication with the manager 110 is interrupted, and the interceptor 120 ceases to receive periodic system load updates.

The manager 110 can instruct the interceptor 120 to cease redirection to a particular network address/port endpoint. This can be part of an effort to reduce the load on that particular web server 102 or host 100. In one embodiment, upon determining that the load on a particular web server 102 is too high, the manager 110 automatically instructs the interceptor 120 to cease redirecting traffic to that web server 102. When the load on that web server 102 was decreased sufficiently, the interceptor 120 is instructed to include the web server 102 in the list of available web servers.

Alternatively, in combination with a command to the interceptor 120 to cease redirecting to a particular web server 102, the manager 110 can instruct the agent 106 to instruct the web server interface 104 associated with that web server 102 to redirect users from that web server 102. Users can be redirected from a web server 102 either to the interceptor 120, which will in turn redirect to another web server 102, or users can be redirected directly to another web server 102. By having the interceptor 120 cease sending users to the server and simultaneously off-loading users as possible, i.e. when the users' session does not have state, the web server 102 can be emptied of user connections. This can be useful to quickly reduce the load on a server to acceptable levels. This can also be part of an effort to shut down a web server 102 for maintenance or other reasons.

If the goal is to empty the web server 102 of sessions, it can be useful to monitor the user web page requests directed to the web server 102, which will become less frequent as users are sent elsewhere. In one embodiment, the system is shut down by initiating redirection by the interceptor 120 and the web server 102 and waiting for a predetermined amount of time between web page requests. If in that predetermined amount of time no web page requests have been received, the system must be considered ready for shutdown. In one embodiment, ten minutes is an effective predetermined time between web page requests.

In one embodiment, the manager can automatically instruct the interceptor 120 to cease directing requests to a particular web server 102 and instruct the web server interface 104 to redirect requests from that web server 102. The automatic instruction can be triggered by an event such as detection of errors or other problems with the web server 102. When the web server 102 has been emptied of requests, the web server 102 can be automatically restarted by instructing the agent 106 to restart the web server 102. This automatic restart of the web server 102 upon the detection of a problem can clear the web server 102 of errors without system operator intervention.

After some time, a web server 102 that was redirecting requests can be ready to accept users again, either because the load has decreased to an acceptable amount, or system updates or maintenance have been performed successfully. In this case, the system can commence servicing web page requests instead of redirecting users from the system. The manager 110 can instruct the agent 106 to instruct the web server interface 104 to cease redirection. Also, the interceptor 120 can be instructed to reenable the web server's 102 network address/port endpoint.

In one embodiment, if the load on all the web servers 102 responsible for an application reaches an appropriately high limit, or if the manager 110 determines that it has been redirecting traffic back and forth to and from the same web servers 102 in an appropriately short period of time, i.e., thrashing, the manager 110 will consider the system "swamped." It will then re-introduce all available servers, and allow the system to operate without any redirection from web servers 102 until the overall load returns to acceptable levels. In this way, the manager 110 will not worsen the load on a swamped site by introducing additional management overhead.

In one embodiment, either an application or an entire web service system can be swamped. The exact thresholds will depend on the configuration of the system. Having a significant percentage of endpoints, for example more than a third, disable on the interceptor's 120 list, can indicate a swamped system. Excessive overall load, however well distributed, would also qualify. In one embodiment, even if the system is swamped, the interceptor 120 passes new requests to a server as usual. In another embodiment, when the system is swamped, it turns away the users by sending the sorry page.

In one embodiment, upon receiving notification from an agent 106 that a web server 102 has failed, the manager 110 directs the interceptor 120 to cease redirection to that endpoint for that web server 102. When the web server 102 is revived, the interceptor 120 is instructed to add that web server 102 back into the list.

In one embodiment, the manager 110 is an application implemented in the Java language. In this embodiment, the manager 110 requires a Java Virtual Machine. In another embodiment, the manager 110 is implemented as a native-code application. In another embodiment, the manager 110 is implemented as firmware on a special-purpose computer.

In one embodiment, the manager 110 runs under a watcher 111. The manager 110 is a child process of the watcher 111. The watcher 111 will restart the manager 110 if it stops running due to inadvertent software or hardware failure. In a UNIX embodiment the manager 110 runs as a daemon. In a Windows NT embodiment, the manager 110 runs as a service.

In one embodiment, the manager 110 uses a database to store information about the system components, called a managed objects database 112. The managed object database is unique to each instance of the manager 110. In other words each instance of the manager 110 has its own managed objects database.

The manager 110 also uses a database to log users requests to web server 102, called the logging database 114. In a Java embodiment the manager 110 uses the JDBC (Java Database Connectivity) standard database interface. This allows any compatible database to be used for logging data, and therefore for retrieving the information from the database.

In one embodiment, the information to be logged can be configured for each server. In another embodiment it can be configured for each application. As described earlier, the information from web server 102 is passed to web server interface 104, which passes it on to agent 106, which sends it onto the manager 110. The information that can be logged can include the information in Table 3. The information can also include a log time indicating when the request was logged in the database.

In one embodiment, additional information can also be logged. For example, the information from the agent 106 also can be logged. Such information can include the round trip time for the transaction from the initial connection until the connection is closed and the request queue length estimating the number of requests waiting in the request queue at the time of a request initiated by the agent 106.

The manager 110 also logs information about the hosts 100 on which the web servers 102 are running. This logging is accomplished based on a series of data tables about each host, and the performance of the hardware on the host 100. The database includes information about each host 100. Such information can include some or all of the information in Table 4. The host information can be logged only once. In one embodiment, the agents 106 transmit host information when they first power up. The information is not logged unless it is different from the information already in the database.

TABLE 4

Host Information

1. The host id or network address of the host.
2. The host name of the machine.
3. The maker of the machine.
4. The manufacturer's architecture specification for the host, which is usually the chip set used (e.g. x86, Alpha, Sparc); the manufacturer's machine "type" designation.
5. The OS family (e.g. WIN32_NT, SunOS).
6. The revision of the OS.
7. The amount of memory, for example the number of megabytes, of physical RAM in the machine.

Within every host, there will be some number of devices, about which can be recorded the information in Table 5.

TABLE 5

Device Information

1. An assigned identifier for the particular component.
2. A HostID, from the hosts information, identifying which host holds this device.
3. The name of the device.
4. The type of the device (e.g. "Processor" for CPUs, "Disk" for hard disk).

In one embodiment, a table for each network interface can be kept. This is used primarily to help the user keep track of which network addresses are associated with each component. The information stored can include the hardware name of the interface, the host id containing the interface, the network address, and other network information such as the subnet mask or the broadcast address associated with the host 100.

Information is logged about each host 100 and each device on each host 100, that is, for example, for each disk, CPU, and network interface on each particular host 100. In addition, an overall metric, for each network address/port endpoint can also be computed to provide additional load information. It is possible that the set of measurements available for each type of component will vary from operating system to operating system, as is shown in Table 2.

In one embodiment, the metrics stored can include an assigned identifier for the available metric, the operating system for which the metric is available, the type of device to which the metric applies, and the name of the metric (e.g. "% Time Idle" or "Bytes Read/second"). Each agent 106 can periodically sample each metric and report them, and periodically the manager 110 will compute utilization metrics for each endpoint and report those. In one embodiment, the actual data being collected is recorded. The data can include the identifier of the component being measured; the identifier of the metric being measured; the start time of the measurement interval; the stop time of the measurement interval; the measurement value. Another embodiment stores additional metrics.

The manager 110 also logs events. This allows the data to be queried on the console's 116 behalf, to provide a system operator with a graphical listing of events. The event information that is logged can include the information in Table 6.

TABLE 6

Event Information

1. The internal name of the WebSpective entity originating the event.
2. The user-assigned, familiar name of the originating entity.
3. A human-readable name for the event type.
4. An event code for the event type.
5. A string describing the event, with format and contents depending on the particular type of event.
6. The date/time the event occurred.
7. The date/time the event was logged into the database.

The manager 110 periodically updates the interceptor 120 with host 100 and web server 102 load and metric information. The manager 110 will also notify the interceptor 120 of configuration and state changes, such as when a web server 102 is added or removed, or fails or recovers. The manager 110 can also send other operational commands to the interceptor 120. The interceptor 120 can send event information to the manager 110. The interceptor 120 can also send acknowledgments of manager 110 commands.

The manager 110 will send commands to the agent 106 to configure the agent 106, web server interface 104, and web server 102. These commands can include commands to add or delete web servers 102 from operation. If the manager 110 does not receive an update from an agent 106 for a predetermined period of time, the manager 110 will send a ping message to the agent 106 to verify that the agent 106 is still functional.

VI. The Console

The console 116 provides a user interface to the system operator. There can be one console 116, or, as shown in FIG. 1, there can be several consoles, 116A, 116B . . . 116X. The number of consoles in the figures is illustrative, and is not meant to limit the scope of the invention to any particular embodiment. Each console 116 can access information collected by the manager 110. Each console 116 can direct the manager 110 operation. The console can also receive alerts, which are special events that the system operator has requested that the web service system 90 alert the system operator to. The console 116 can receive alerts when the events that trigger the alerts arrive at the manager 110. If no console 116 was connected when the alert was generated, the alerts can be queued and displayed when a console 116 is connected to the manager 110 and/or the alerts can be stored in the logging database 114 for later retrieval.

At startup, the console 116 registers with the manager 110. A connection is established between the console 116 and manager 110 for an information feed from the manager 110 to the console 116. In one embodiment, the information feed is accomplished with a subscription model. Information updates on each particular component can be requested. Each console 116 can subscribe to an information feed for any component or combination of components. Once an information feed for that component has been requested by the console 116, that console 116 will receive updates at periodic intervals or in response to changes of state in that components. The updates will continue until the console 116 modifies the request so that it will no longer receive that information. The console 116 can also request to receive the alerts from the manager 110.

The console 116 can issue commands to the manager 110. The commands can include: a request to open a connection for a console 116, or to close a connection; a request for updated information for a particular component, or requesting that updates for that component be discontinued; a request for certain events; a request for the current list of system components in the manager's 110 managed object database; a request to add or delete a component; a request to read or set properties associated with a component; and a request to add, delete, or modify data in the managed object database 112.

In one embodiment, the console 116 is implemented in Java, so that it is platform independent. In another embodiment, the console 116 is a native processor code application. Each version of the console 116 can be configured with the network address/port endpoint at which to contact the manager 110. The console can also be configured with the local network address/port endpoint to listen for messages, for example event notification, from the manager 110.

Figure 6:
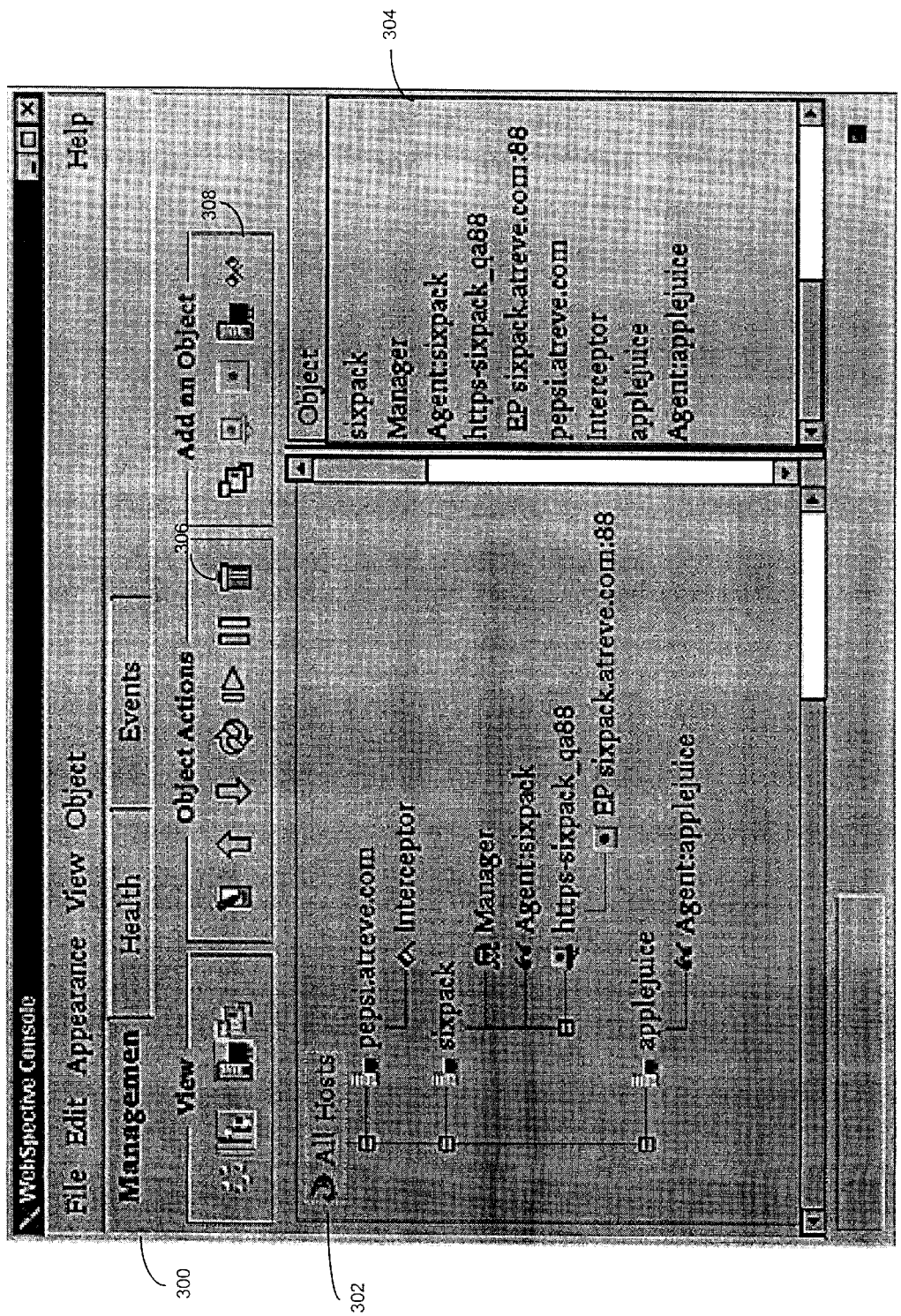
FIG. 6 is an embodiment of a console of FIG. 1 displaying the components of a web service system according to the present invention in a tree view.

In one embodiment, the console 116 provides a graphic representation of the web service system 90. Icons represent the components. Referring to FIG. 6, in one embodiment, management tab 300 is selected. Tree 302 shows three hosts: "pepsi.atreve.com," "sixpack", and "applejuice". The host "pepsi.atreve.com" includes an interceptor. The host "sixpack" includes a manager, an agent, called "Agent:sixpack," and a web server, "https-sixpack-qa88." The web server includes a web server interface "EP sixpack.atreve.com:88."

Figure 7:
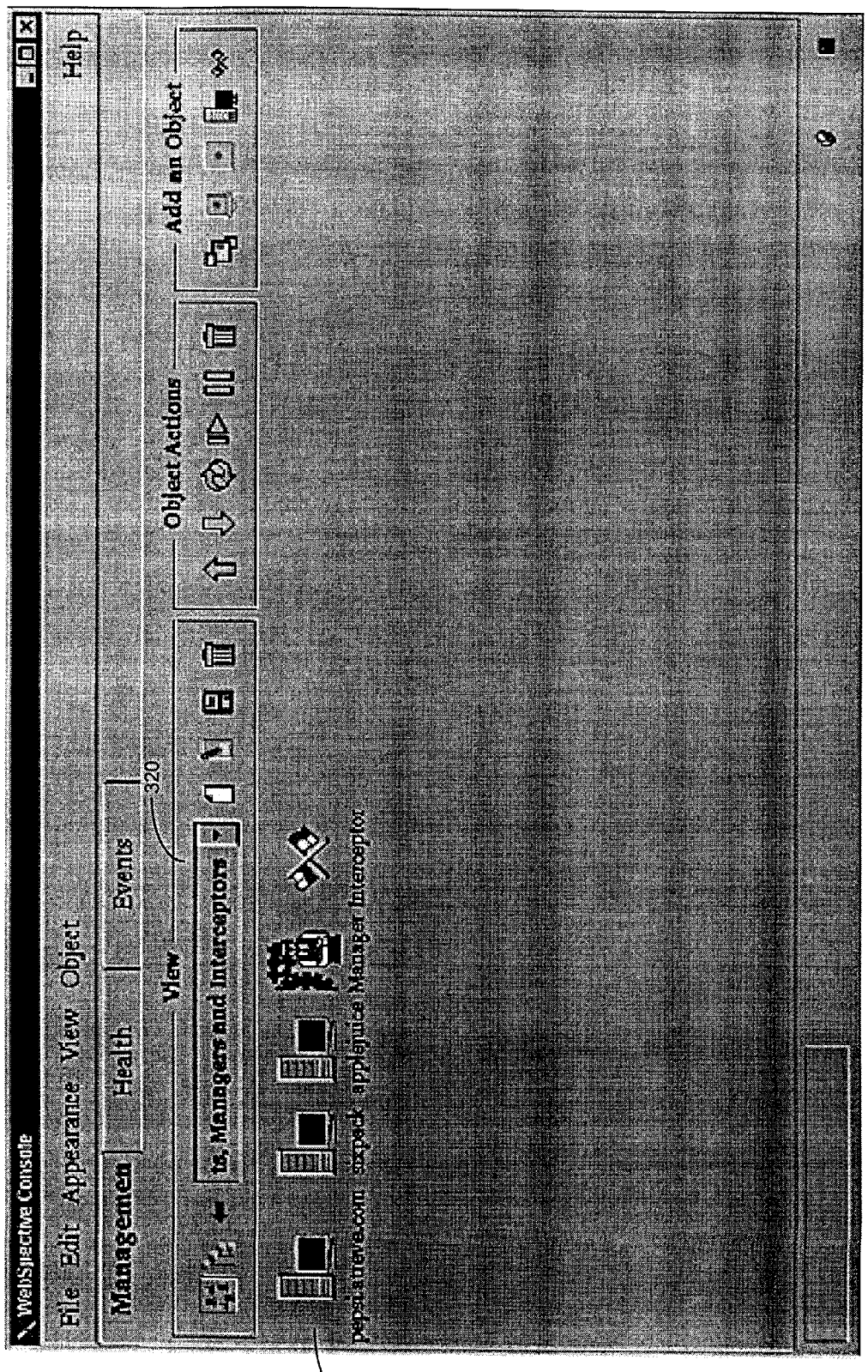
FIG. 7 is an embodiment of a console of FIG. 1 displaying the components of a web service system according to the present invention in an icon view.

The host "applejuice" includes an agent, called "Agent:applejuice." In the embodiment shown, a system component can be selected on either the tree view or in the object list 304. When an object has been selected, more information can be requested about that object, or an action 306 can be initiated on the object. A system component can be added by selecting a component to add in box 308. In another embodiment, and referring to FIG. 7, each component in the system is displayed as an icon. The components to be displayed can be chosen by the view selector 320.

Figure 8:
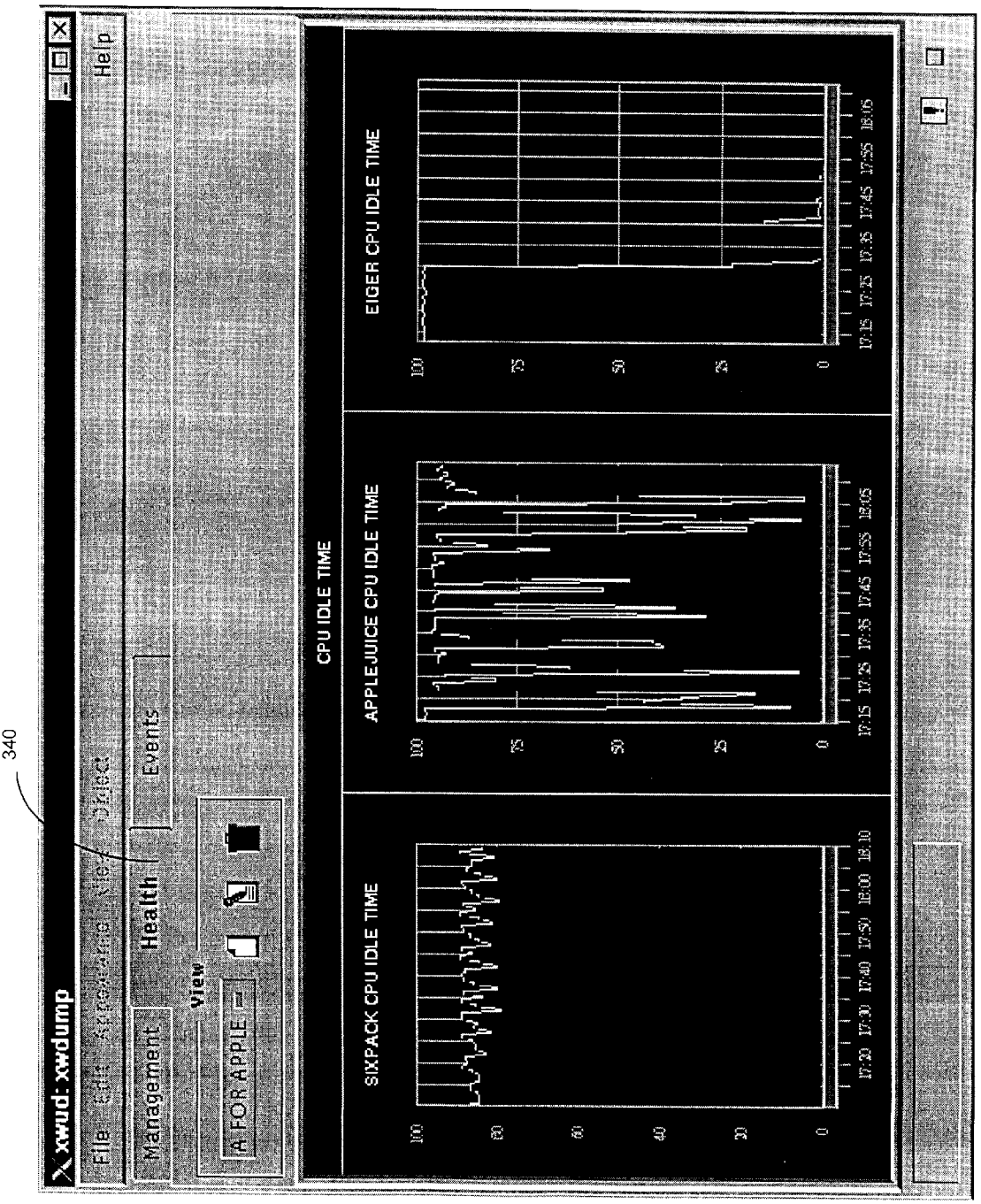
FIG. 8 is an embodiment of a console of FIG. 1 displaying performance information for a component of a web service system according to the present invention.
Figure 9:
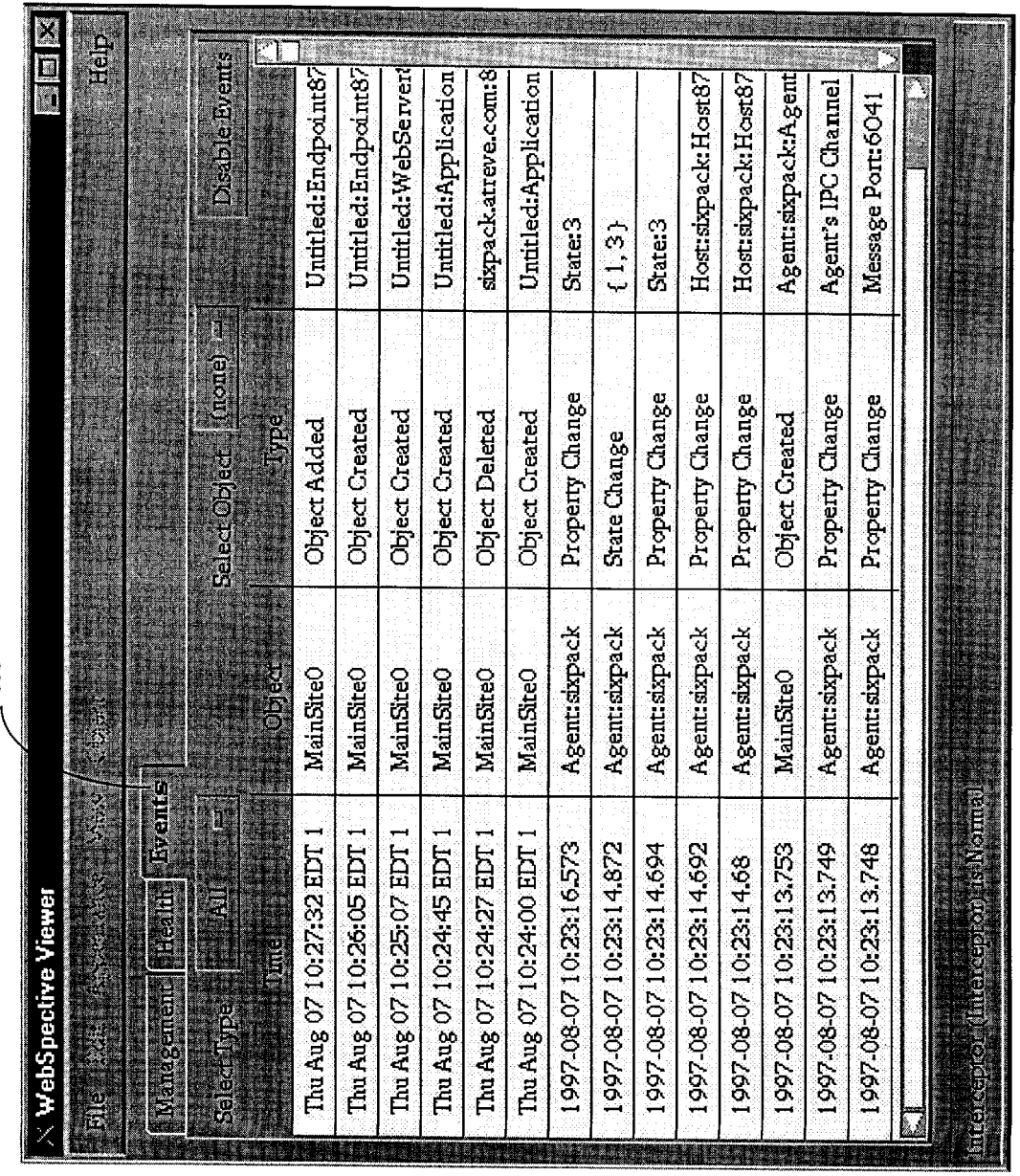
FIG. 9 is an embodiment of a console of FIG. 1 displaying an events log for a web service system according to the present invention.

In one embodiment, and referring to FIG. 8, the console allows the system operator to graphically display the metrics and statistics logged by the manager 110. In the example of FIG. 8, the CPU idle time is shown for three hosts: "sixpack," "applejuice," and "eiger." In one embodiment, and referring to FIG. 9, the events tab 350 selects a list of events within the system. The events that appear in this list, depending upon configuration, can include, but are not limited to: state changes; component property changes; performance metric thresholds being crossed; ping events such as ping time-outs and ping failures; application events, such as application problems or enable/disabled or deactivated applications; error events; component events, such as addition or deletion of objects or members; and load balancing events, such as the addition or removal of an endpoint from an application, or an activation or deactivation. This list can be sorted according to various criteria.

VII. Watcher

Referring to FIG. 1, a watcher 109, 111, 118 is used for components that must remain available. The watcher 109, 111, 118 monitors the component(s) under its care. If a component fails, the watcher attempts to start another instance of the component, and also reports the failure. A component may fail due to hardware or software error. A software error can be caused by the component or by another program that interacts with the component. In one embodiment, a watcher is assigned to each interceptor 120, manager 110 and agent 106. When one of these components is started, it is actually the watcher that starts. The watcher then activates the component by starting it as a child process of the watcher.

Figure 10:
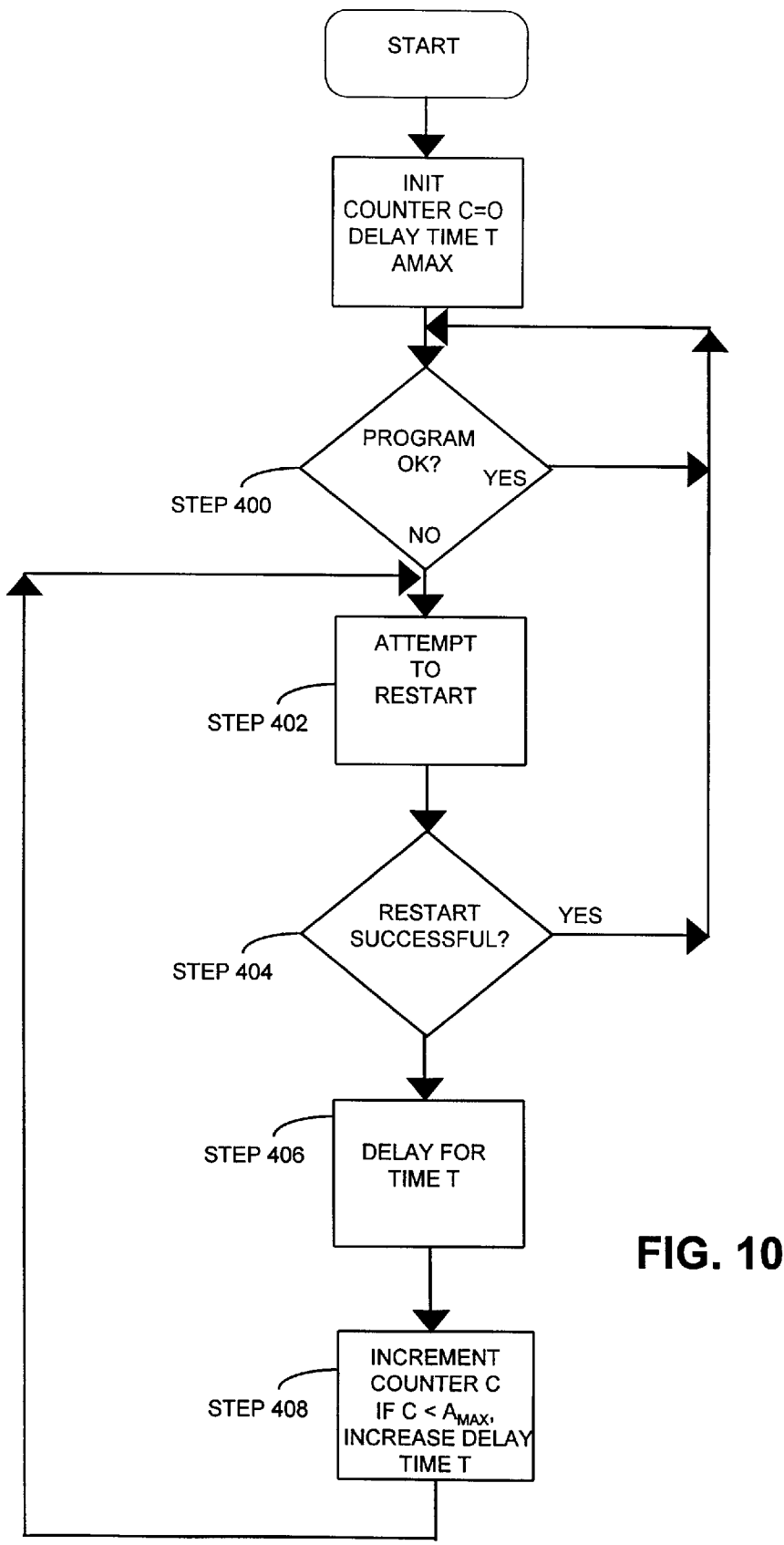
FIG. 10 is a flowchart depicting the operation of an embodiment of a watcher of FIG. 1.

Referring to FIG. 10, the watcher monitors the component to verify that it is functional. (Step 400). If a component fails, the watcher will attempt to restart it. (Step 402). If the attempt to restart is not successful, the watcher will wait a period of time before attempting to restart the component. (Step 406). If the component immediately fails, the watcher will wait a longer delay period before attempting to restart. (Steps 406, 408). The watcher will increase the delay between attempts to restart until some predetermined number of attempts $Am_n$. From that time forward, the delay between attempts will remain constant.

The watcher can log events such as that the watcher is started; that the watcher is unable to start a component; that the component is started; that the component has exited prematurely (failed); that the component has exited gracefully; and that the watcher exited after receiving an exit signal.

VIII. Communication Across Firewalls

Figure 11A:
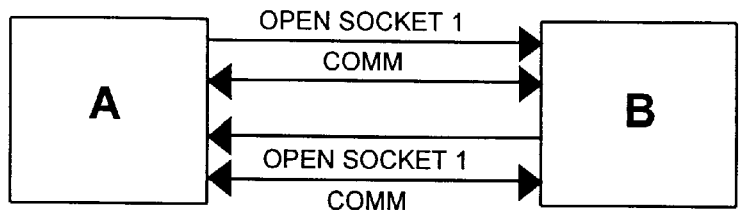
FIG. 11A is a block diagram of communication between two components of FIG. 1 when no firewall is present.
Figure 11B:
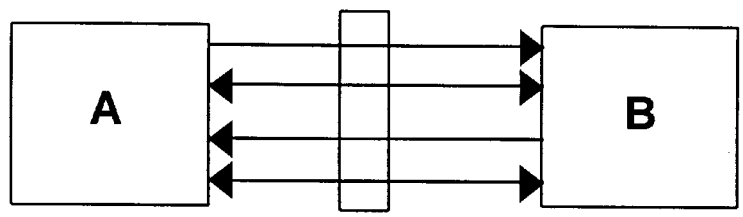
FIG. 11B is a block diagram of communication between two components of FIG. 1 across an ideal firewall.
Figure 11C:
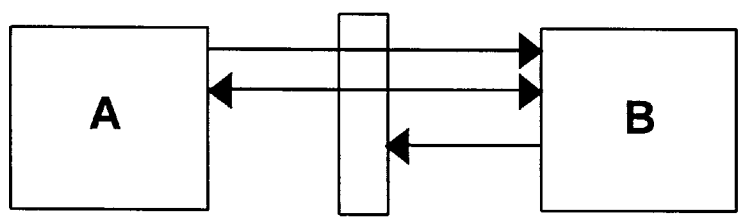
FIG. 11C is a block diagram of communication between two components of FIG. 1 across a one-way firewall.
Figure 11D:
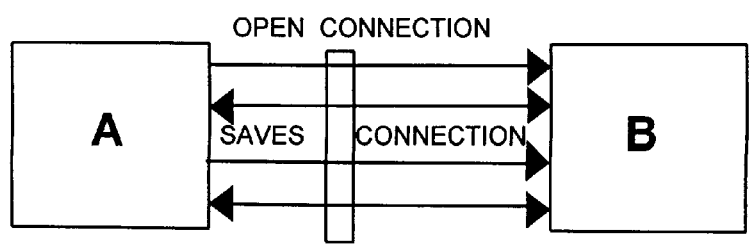
FIG. 11D is a block diagram of communication between two components of FIG. 1 across a one-way firewall by saving a connection.

Communication between components can take place across networks that include firewalls. Referring to FIG. 11A, without a firewall, both Component A and Component B can each initiate communication with the other. Referring to FIG. 11B, an ideal firewall also allows point-to-point traffic to be initiated by either component. Referring to FIG. 11C, some firewalls allow contact to be initiated only in one direction and not the other direction. Here component A can initiate a connection, after which component A and component B can communicate. Component B cannot initiate a connection. The system can operate in such a firewalled environment by maintaining a connection across the firewall. The connection that is maintained is initiated by component A. Referring to FIG. 11D, component A opens a connection across the firewall. That connection can be used for data communication, but also includes a control channel. When communication is complete, the connection is not closed, but saved so that component B can request a new connection. The control channel thus remains open after the communication is complete. If component B needs to communicate with component A, it can send a message to component A via the control channel requesting that component A open a new connection. Component A will then open a new connection to component B.

In one embodiment, a component first attempts to establish a connection, when it is launched and begins operation. For example, when the interceptor 120 is launched, it will attempt to contact the manager 110. Referring again to FIG. 11D as an example, component A initiates a connection when it is launched. When the receiver, in this example component B, observes that the connection has been established, it will also attempt to initiate a reciprocal connection, at the same time, to component A. If the receiver (component B) cannot initiate a reciprocal connection, it informs component A that it cannot establish a reciprocal connection, and that the first connection should be saved. If the connection is saved, it remains open for use until the firewall or other network obstacle or error causes the connection to be lost. In this case, the component A can periodically try to re-establish a connection, even if it has nothing to send, because it knows that component B cannot initiate a connection. If both components are capable of initiating connections, the first connection need not be saved.

IX. Choosing A Web Server

The interceptor 120 chooses which web server 102 it will refer a request to based on a load metric ("LM") determined for each available web server 102. Each web server 102 is mapped to an interval between 0 and 1. The size of the interval associated with a web server 102 is proportional to the load metric for that web server 102. The interceptor 120 generates a random number between 0 and 1. The web server 102 mapped to the interval containing the chosen random number is selected as the web server 102 that will receive the request. In this way, there is a somewhat random distribution, yet there is a higher probability that the web servers 102 with the lightest load will be chosen.

Figures 12A, 12B:
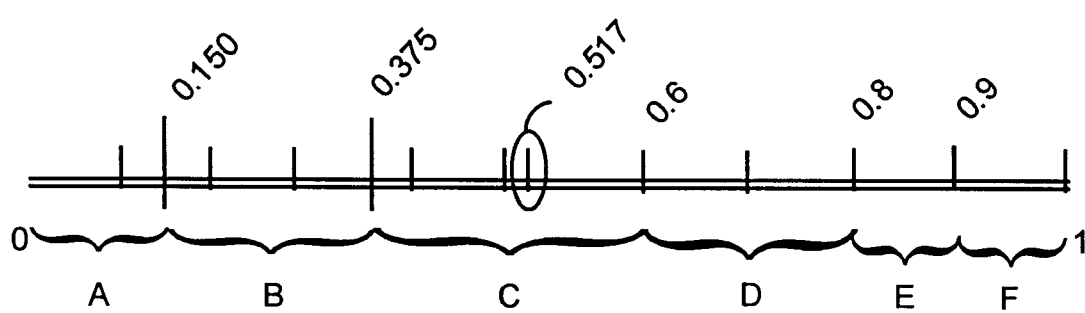
FIG. 12A is a table showing the processing of weighted load metrics into line intervals in an embodiment of the interceptor of FIG. 1 having six web servers.
FIG. 12B is a graph of the line intervals for the web servers of FIG. 12A.

For example, and referring to FIG. 12A, if there are six web servers A, B, C, D, E and F, each of the six web servers A-F will be assigned to an interval between 0 and 1. The width of the interval will be proportional to the weighted load metric for that web server. In this example, the six web servers have the load metrics $LM_A=1500$, $LM_B=2250$, $LM_C=3250$, $LM_D=2000$, $LM_E=1000$, and $LM_F=1000$. The load metrics total 10,000, so to normalize the intervals to a range between 0 and 1, each load metric is divided by 10,000. This produces the following interval widths ("W") for each web server: $W_A=0.150$, $W_B=0.225$, $W_C=0.325$, $W_D=0.2$, $W_E=0.1$, and $W_F=0.1$. Each web server is assigned an interval that is of the appropriate width in the range between 0 and 1. In this example, web server A is assigned the interval 0–0.150, web server B is assigned the interval 0.15–0.375, web server C is assigned the interval 0.375–0.6, web server D is assigned the interval 0.601–0.800, web server E is assigned the interval 0.801–0.9, and web server F is assigned the interval 0.901–1.0. Referring to FIG. 12B, the mapping of these intervals to the range 0 to 1 shows that the intervals cover the range 0 to 1. As is apparent from the figure, web server C, which in this example has the largest weighted load value, $LM_C$=3250, indicating that this web server can process requests most quickly, has the largest interval, $W_C$=0.325. Web server C has a high probability of receiving new requests.

Having distributed the web servers on the interval, the interceptor 120 generates a random number between 0 and 1. In this example, the interceptor 120 generates the random number 0.517. The interceptor 120 sends the request to the web server 102 that has the interval that contains the number 0.517. In this example, the number 0.517 falls into the range 0.376–0.6, and so the request is referred to web server C.

The Load Metric

In one embodiment, the load metric for each web server is determined by a static, default capacity value ("C"). The default capacity value can be assigned by the system operator to each web server 102 in the web service system 90. In one embodiment, the system operator can assign a value ranging from 1 to 10 to each web server 102, which is a relative evaluation of the load capacity of that web server 102. For example, the web server 102 with the greatest capacity, possibly with a relatively large number of processors running at the relatively high clock speed, can be assigned a capacity of 10. A relatively slow web server 102 with only one processor can be assigned a capacity of 1.

In another embodiment, the load metric for each web server 102 is determined by a dynamic load value generated by the manager 110. The manager 110 periodically sends an updated load value for each web server 102 to the interceptor 120. The dynamic load value reflects the current capacity of each web server 102 based on one or more metrics that provide real-time evaluation of web server performance.

The dynamic load value is useful when it reflects the current status of the web server 102. The dynamic load value is less useful if it is not a relatively recent indication of the web server's ability to process requests. In one embodiment, therefore, the interceptor 120 combines the dynamic load information (L) and the static load capacity (C) values in a weighted average that is weighted by the age of the dynamic load information. This weighted average is used as the load metric ("LM"). The system operator can specify an obsolescence time (T) after which the dynamic load information is no longer useful. In normal operation, the dynamic load updates can arrive with sufficient frequency that the static defaults are not used. But if, for example, there is an error on the manager 110, or a communication breakdown between the manager 110 and the interceptor 120, or any other reason that the interceptor 120 does not receive periodic updates from the manager 110, then as the amount of time since the last dynamic load information update approaches time obsolescence (T), the interceptor 120 will weigh the dynamic load information less heavily and the static default capacity value more heavily.

In one embodiment, this transition over time from dynamic to static data is linear. A proportion (P) is calculated as the proportion of the obsolescence time (T) elapsed since the last dynamic load information update $$\left(P = \frac{\text{elapsed time}}{T}\right).$$

The proportion (P) is then used to weigh the dynamic load (L) and the default capacity (C) as they are combined into a load metric (LM) such that (LM=(P×C)+((I–P)×L)). If, for example, the system operator sets the dynamic load information obsolescence time (T) to be 30 minutes, then if no update is received after 15 minutes, the load metric will weigh equally the static and the dynamic values. After 22.5 minutes, the load metric (LM) can include 75% of the static value and 25% of the almost obsolete dynamic value.

As another example, suppose the system operator sets the obsolescence time (T) to 20 minutes. If web server 102A was assigned a default value of 2, this can be converted to a static capacity value of 2,000. Also suppose that dynamic value of 1,000 is received from the manager 110. At the time that the dynamic value is received, time $t_0$, the elapsed time is 0, so P=1.0. The load metric LM is 1,000, which is the dynamic load value. If, due to a network communication problem, no further information is received from the manager 110, then after five minutes have elapsed, at time ($t_5$), the interceptor 120 would use a load metric that is (5/20), or 25%, default value and 75% of the dynamic value. This results in a weighted load metric (LM) of 1250, since (0.25)(2000)+(0.75)(1,000)=1250. After ten minutes have elapsed, at time ($t_0$), LM=1500. After fifteen minutes has elapsed, LM=1750. After twenty minutes has elapsed, the dynamic value is no longer used, and LM=2000. The load metric can remain at 2000 until connection with the manager 110 is reestablished and updates are received.

In one embodiment, the interceptor 120 itself also adjusts the load metric (LM) each time it refers a request to a web server 102. The load metric (LM) for the web server to which a request is referred is incremented by a predetermined adjustment value ($\epsilon$). This adjustment reflects that the web server 102 to which a request is referred has probably become more heavily loaded as it responds to the referred request. If many requests are referred to the same web server 102, that will be reflected in the load metric (LM) for that web server 102 even before a dynamic load update is received from the manager 110. In one embodiment, the adjustment value ($\epsilon$) is a relatively small number compared to the load metric.

The Dynamic Load Value

The load value can be based one or a combination of the various metrics that indicate load and the ability of web servers 102 to process requests. In one embodiment, the Manger collects data from the agents 106, and periodically, after a predetermined interval, calculates the load information and sends it to the interceptor 120. In one embodiment, the predetermined interval is approximately one minute. In one embodiment, for each web server 102, the following data can be received by the manger 110 from the agent 106. The length of the time interval during which the data was collected, the number of requests received, which can include all requests or can include a predetermined subset of the requests; the total processing time required to service the requests, which can be an average or can be based on a representative request; the number of requests which generated an error because of an error the request; the number of requests which generated an error because of web server errors; the amount of time spent waiting in the queue, which can be an average of many or all requests, or can be one representative value; the size of the queue, which can be an average of many or all requests during the time period or can be based on a representative sample. Other data can also be collected and used to measure relative web server load.

In one embodiment, the dynamic load value is based on the average processing time required to process each request. The manager 110 receives an average of the total processing times of all requests made during the sample period. The processing time includes the time the request waited in the request queue and the time spent processing the request. The average of the times for each web server is compared, and dynamic load values determined.

In another embodiment, the manager 10 bases the dynamic load value on test messages sent by the agent 106 to the web server 102. For each test message, the queue delay, which is the time a request spends waiting to be processed, is used to measure web server performance. The average queue delay can be used, or a representative sample can be used, such as the queue delay for the last test request sent by the agent 106 to the web server 102. The queue delay for each web server 102 is scaled to the range 0–10,000, where 10,000 indicates a short delay and 0 indicates a long delay. This scaled value is sent to the interceptor 120 as the dynamic load value.

In other embodiments, other metrics such as the queue size, or the number of errors generated, can be used to dynamically measure load.

In one embodiment, the dynamic load numbers do not necessarily apply to all web servers. If a web server 102 has a problem, or is deactivated, or not operating, it is not used. A threshold also can be specified for which the web server 102 is considered heavily loaded, and no requests may be redirected to that web server 102. A threshold also can be specified for which the web server 102 is under maximum load. The manager 110 can instruct the agent 106 to redirect requests from that web server 102 if the web server 102 is under maximum load.

In one embodiment, the heavily loaded determination is based on the average processing time for requests and the average queuing time. If this average total time is greater than a specified threshold, the manager 110 considers the web server 102 heavily loaded. If all web servers are heavily loaded, the manager 110 can determine that the web service system is under peak load, and may not redirect requests from the web servers.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A system for managing one or more web servers, comprising:
   a traffic management subsystem for referring a browser's web page request received by a first one of the web servers to a second one of the web servers, the referring comprising transmitting a redirect instruction and a network identifier of the second one of the web servers from the first one of the web servers to the browser thereby causing the browser to send the web page request directly to the second one of the web servers;
   a monitor for collecting and storing information related to the web page request, the information comprising performance and network information associated with the web page request; and
   an identifier for identifying problems with the web servers and providing automatic notification to a system operator of events indicating problems with one or more of the web servers.

2. The system of claim 1 wherein the traffic management subsystem comprises an interceptor receiving web page requests and distributing the web page requests to the web servers based on the load on the web servers.

3. The system of claim 2 wherein the web servers are capable of referring web page requests based on the load on the web servers.

4. The system of claim 3 wherein the traffic management subsystem further comprises a manager for receiving web server load information and communicating the web server load information to an interceptor.

5. The system of claim 4 wherein the traffic management subsystem further comprises an agent for directing the web servers.

6. The system of claim 5 wherein the manager directs the agent to direct one of the web servers to refer web page requests.

7. The system of claim 6 wherein the web servers run on hosts; and wherein each host comprises an agent in communication with at least one of the web servers on the host and wherein each agent is also in communication with the manager.

8. The system of claim 1 wherein the monitor comprises a manager receiving web page request information and storing the web page request information in a database.

9. The system of claim 8 wherein the manager receives web page request information from the one or more of the web servers.

10. The system of claim 8 wherein the manager receives web page request information from one or more agents each in communication with at least one of the web servers.

11. The system of claim 8 wherein the web page request information is stored in a relational database.

12. The system of claim 8 further comprising a console for displaying information to a system operator.

13. The system of claim 12 wherein the console is capable of alerting the system operator to events.

14. The system of claim 12 wherein the console is capable of retrieving the web page request information from the database and displaying the web page request information to the system operator.

15. The system of claim 1 wherein the identifier comprises a manager receiving web page request information and storing the request information in a database.

16. The system of claim 15 wherein the events received by the manager are sent by an agent.

17. A system for managing one or more web servers, comprising
   a traffic management subsystem for referring a browser web page request received by a first one of the web servers to a second one of the web servers such that the web page request is made by the browser directly to the second one of the web servers;
   a monitor for collecting and storing information related to the web page request; and
   an identifier for identifying problems with the web servers and providing notification of events indicating problems with one or more of the web servers, said identifier comprising a manager capable of taking corrective action in response to notification of events indicating problems with one of the web servers.

18. The system of claim 16 where the manager notifies a system operator upon the occurrence of an event.

19. The system of claim 17 wherein the manager notifies a system operator when automatic corrective action taken in response to an event caused by a problem does not resolve the problem.

20. A system for managing one or more web servers, comprising:
   a traffic management subsystem for referring a browser web page request received by a first one of the web servers to a second one of the web servers such that the web page request is made by the browser directly to the second one of the web servers;
   a monitor for collecting and storing information related to the web page request;
   an identifier for identifying problems with the web servers and providing notification of events indicating problems with one or more of the web servers; and
   a version controller for updating web pages on the web servers.

* * * * *